United States Patent [19]

Smith et al.

[11] Patent Number: 5,006,677
[45] Date of Patent: Apr. 9, 1991

[54] AUTOMOBILE BRAKE VACUUM SWITCH

[75] Inventors: John W. Smith; James P. Meagher, both of Indianapolis, Ind.

[73] Assignee: Emhart Industries Inc., Farmington, Conn.

[21] Appl. No.: 472,727

[22] Filed: Jan. 31, 1990

[51] Int. Cl.⁵ ............................................. H01H 3/14
[52] U.S. Cl. .............................. 200/61.89; 200/61.86; 200/306
[58] Field of Search .............. 200/61.86, 61.87, 61.88, 200/61.89, 86.5, 306

[56] References Cited

U.S. PATENT DOCUMENTS

| | | | |
|---|---|---|---|
| 4,302,638 | 11/1981 | Fox et al. | 200/306 X |
| 4,384,176 | 5/1983 | Chestnut | 200/86.5 X |
| 4,403,123 | 9/1983 | Shek | 200/61.89 |
| 4,404,439 | 9/1983 | Leighton | 200/61.89 |
| 4,439,650 | 3/1984 | Brown | 200/61.89 |

*Primary Examiner*—J. R. Scott
*Attorney, Agent, or Firm*—Robert F. Meyer; Carl A. Forest

[57] ABSTRACT

A housing includes a switch chamber and a plunger chamber communicating with the switch chamber. A plunger is slidable within the plunger chamber. Cam surfaces on the plunger operate electrical switches in the switch chamber. There is an axial channel in the plunger, and a slot through the plunger wall communicates with the channel. A vacuum passageway passes from one side of the housing, into the channel, and a solid extension of the passageway passes through the slot, and into a hole in the opposite wall of the housing. As the plunger moves in and out, the slot slides on the extension to guide to stabilize the plunger. A vent hole in the vacuum passageway opens into the channel. A sealing member slides in the channel along the axis of the plunger, alternately sealing and unsealing the vent hole as the plunger moves. A spring seated between the plunger and the sealing member permits the plunger to continue moving when the sealing member is seated in the passageway vent hole. A maze causes air passing through the switch chamber to the vent hole to turn and slow, thereby causing dust particles to settle out of it.

8 Claims, 24 Drawing Sheets

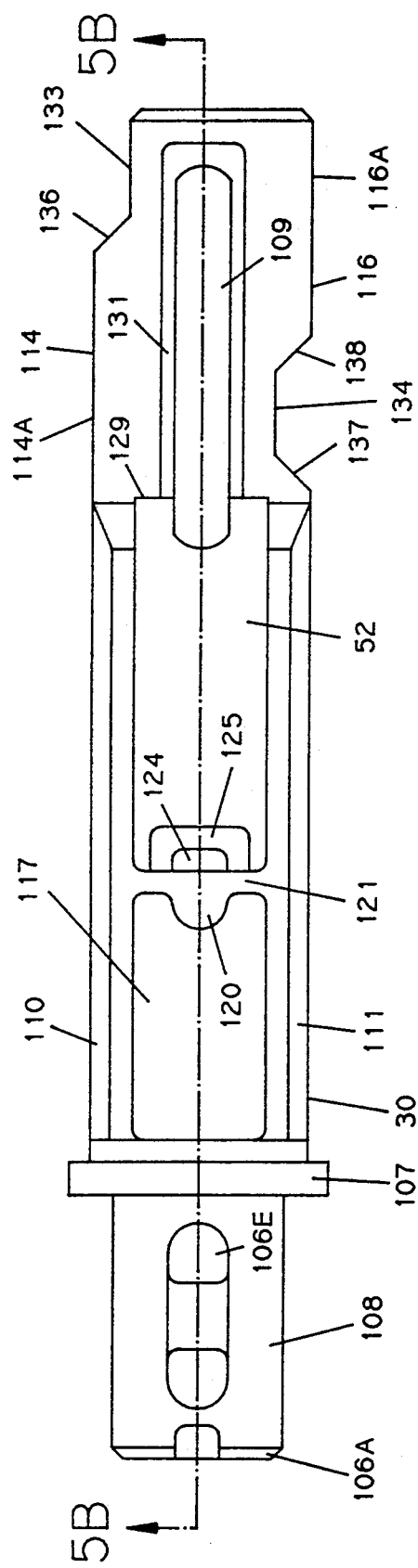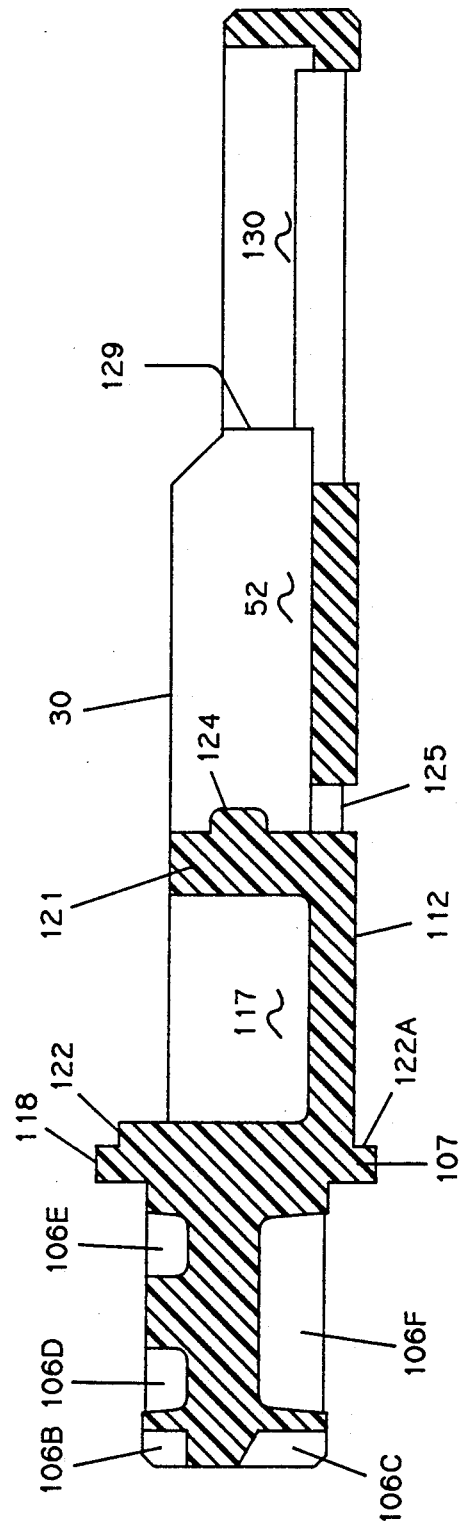
FIG. 5A
FIG. 5B

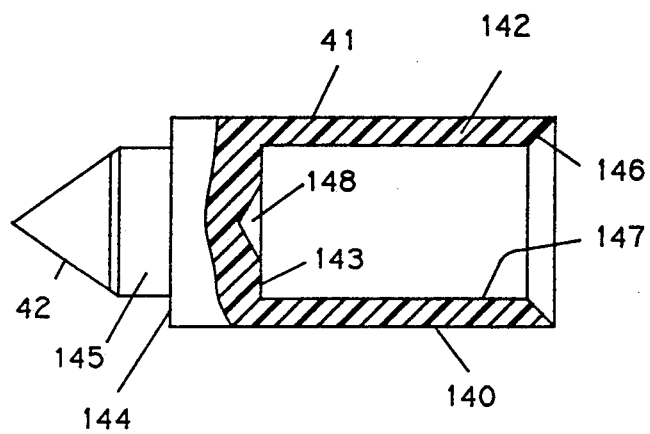 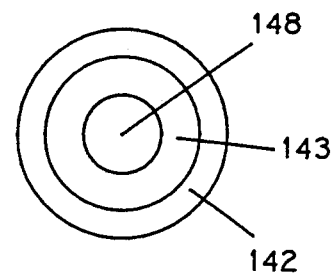
FIG. 6A  FIG. 6B
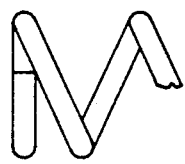 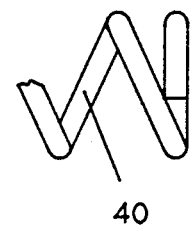
FIG. 7
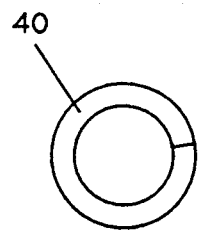
FIG. 8

AUTOMOBILE BRAKE VACUUM SWITCH

BACKGROUND OF THE INVENTION

1. Field of the Invention

The invention in general relates to automobile brake switches and more particularly to such switches that activate a vacuum driven system.

2. Description of the Prior Art.

Switches that are activated by the brake mechanism of an automobile are well known in the art. Such switches generally comprise a housing which includes a switch chamber and a cylindrical plunger chamber, a plurality of electrical switches in the switch chamber, and a plunger movable in the plunger chamber. The plunger is driven by the brake mechanism to operate the switches. See, for example, U.S. Pat. No. 4,384,176 issued on an invention of Benjamin F. Chestnut. In the above patent, the switches are electrical switches. It is also known to use the plunger to activate a vacuum driven system. Such switches operated to open and close a vent to a vacuum line. Generally an automobile brake system will include both electrical and vacuum switches since the vacuum switch offers a mechanical alternative that can operate if the electrical system fails. The nature of the automobile brake system requires that a brake switch be activated at some point along the travel of the plunger, rather than just at the extremes of travel. Thus the switch must be designed to permit the switch to be held on or off during a portion of the travel of the plunger. Prior art vacuum switches have accomplished this by venting the vacuum line at the bottom of a deep cylinder. A plunger rod carries an o-ring in a direction along the axis of the cylinder, and the vacuum is sealed and vented by the o-ring entering or exiting the cylinder. After the o-ring enters the cylinder to seal the vent, the plunger can continue to move and at the same time continue to seal the vent by driving the o-ring further down the cylinder. Similarly after opening the vent by exiting the cylinder, the plunger can continue to vent the tube by moving the o-ring further from the cylinder. While such vacuum switches are effective, the fact that the o-ring continues to move in the cylinder after the vent is sealed leads to wear of the o-ring, decreased reliability, and difficulty in achieving long lifetimes with such switches.

SUMMARY OF THE INVENTION

It is an object of the invention to provide an automobile vacuum brake switch that overcomes one or more of the disadvantages of the prior art switches.

It is another object of the invention to provide an automobile vacuum brake switch that is highly reliable over a long lifetime.

It is a further object of the invention to provide an automobile vacuum brake switch in which the sealing surfaces are immobile after sealing the vent, and at the same time permits the plunger to continue moving.

The invention provides an automobile brake switch assembly comprising: a housing comprising: a switch chamber, a vacuum passageway having a passageway vent hole therein; and a plunger chamber communicating with the switch chamber; a plunger slidable within the plunger chamber; one or more switches enclosed in the switch chamber and operable by the plunger; a sealing member; means for slidably supporting the sealing member so that as the plunger moves back and forth in the plunger chamber the sealing member alternately seals and unseals the passageway vent hole; and spring means located between the plunger and the sealing member for permitting the plunger to continue moving when the sealing member is stopped and seated in the passageway vent hole. Preferably, the means for slidably supporting comprises a channel formed in the plunger, the channel being elongated along the direction of movement of the plunger; and the vacuum passageway comprises a hollow member extending from the housing into the channel. Preferably, the automobile brake switch assembly further includes: a slot formed in the plunger and communicating with the channel; and a plunger guide member extending from the passageway to the housing and passing through the slot in the plunger. Preferably the assembly further includes a hole in the housing and the plunger guide member includes a pin extending into the hole in the housing. Preferably, the automobile brake switch further includes: a housing vent hole in the housing permitting air to pass from outside the housing to the passageway vent hole; and maze means formed in the housing for preventing dust exterior of the housing from passing to the passageway vent hole. Preferably, the sealing member comprises a rigid body portion having an opening for receiving the spring means and a relatively flexible sealing tip portion.

The invention not only provides an automobile vacuum brake switch that is reliable and has a long life, but the switch is also more compact than prior art switches and easier to service or repair. Numerous other features, objects, and advantages of the invention will now become apparent from the following detailed description when read in conjunction with the drawings.

BRIEF DESCRIPTION OF THE DRAWINGS

FIG. 5A is a top plan view of the plunger of FIG. 2;

FIG. 5B is a cross-sectional view taken through lines 5B—5B of FIG. 5A;

FIG. 6A is a partically cross-sectioned side view of the sealing member of FIG. 2;

FIG. 6B is a front view of the sealing member of FIG. 6A;

FIG. 7 is a partial side view of the sealing member spring of FIG. 2;

FIG. 8 is a front view of the spring of FIG. 7;

DESCRIPTION OF THE PREFERRED EMBODIMENT

Figure 1:
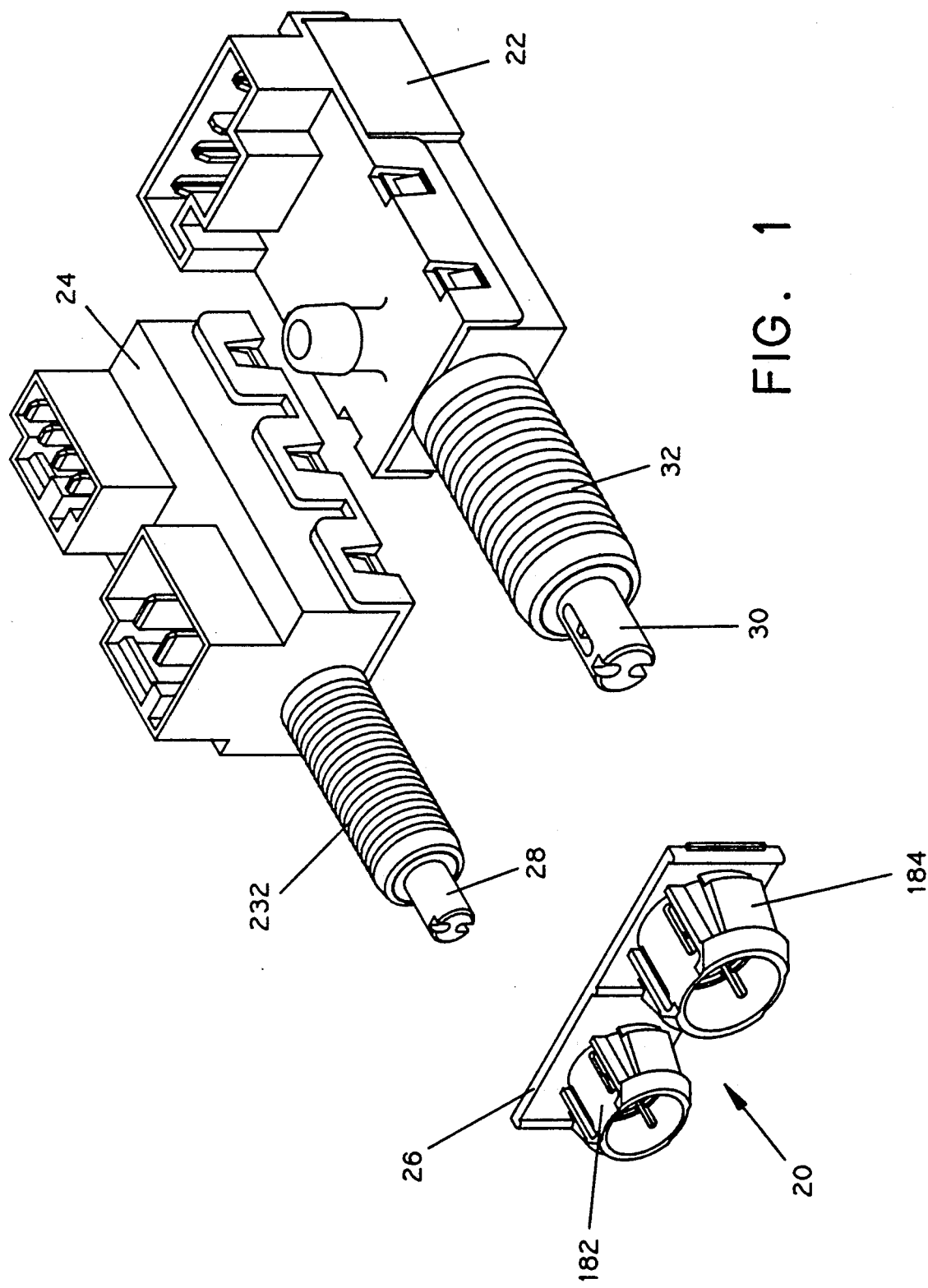
FIG. 1 is an exploded view of the automobile brake switch assembly of which the vacuum switch according to the invention is a part.
Figure 2:
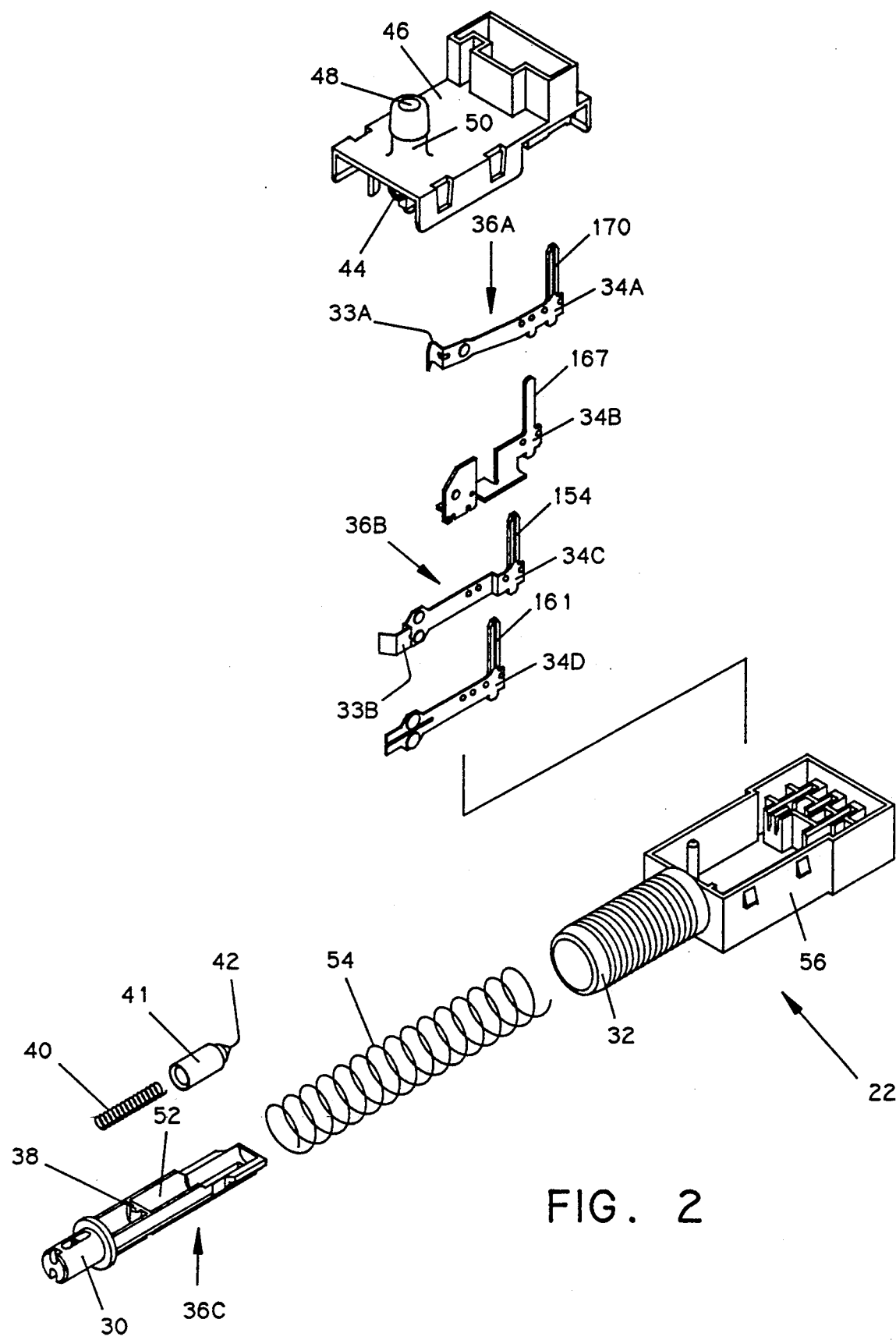
FIG. 2 is an exploded view of the preferred embodiment of the vacuum brake switch according to the invention.

Directing attention to FIG. 1, there is shown an exploded, perspective view of an automobile brake switch assembly 20 of which the vacuum brake switch 22 according to the invention is a part. The assembly 20 also includes a triple-acting switch 24 which will not be discussed in detail herein. It should be understood that the embodiment described herein is exemplary, is for purposes of illustration only, and is not intended to be limiting of the invention. The vacuum brake switch 22 is mounted in a mounting clip 26 which is in turn mounted on the brake pedal bracket or a panel of an automobile so that the brake lever (not shown) connected to the foot brake (not shown) acts on plungers 28 and 30. FIG. 2 shows an exploded, perspective view of the vacuum switch 22. This switch includes plunger 30, valve spring 40, sealing member 41, plunger return spring 54, housing body 56, top spring 34D, bottom spring 34C, stationary terminal 34B, cam spring 34A, and housing cover 46. When plunger 30 is acted on by the brake mechanism (not shown) it moves within cylindrical plunger chamber 32 to drive cam followers 33A and 33B to actuate two electrical switches 36A and 36B; switch 36A comprising cam spring 34A and stationary terminal 34B, and switch 36B comprising bottom spring 34C and top spring 34D. Here the words "top" and "bottom" are words of art referring to types of springs well-known in the art, rather than words denoting relative location. When the context below indicates that the words "top", "bottom", "front", "rear" and "side" are being used to indicate relative location or direction, the words refer to the relative locations or directions depicted in FIGS. 1 and 2, i.e. the top of the page being "top", the bottom of the page being "bottom", the lower left being "front", and the upper right being "rear". As plunger 30 is being driven to the rear by the brake mechanism (not shown), spring seat 38 of plunger 30 acts against valve spring 40 which in turn acts against sealing member 41 to press the sealing tip 42 into vent hole 44 (top of page in FIG. 2) in housing cover 46 which communicates via opening 48 in vacuum passageway 50 with a vacuum activated mechanism (not shown), such as a cruise control mechanism, which it is desired to control via the brake mechanism. When the brake mechanism is released, plunger 30 moves in the forward direction, and sealing member 41 is urged away from vent hole 44 to vent the vacuum passageway 50. Spring 40 permits the plunger to continue moving in the rearward direction after sealing tip is seated in vent hole 44. Sealing member 41 is carried by plunger 30 within sealing member guide channel 52 and thus is free to move with the plunger 30 after the vent hole 44 is vented.

Figure 3A:
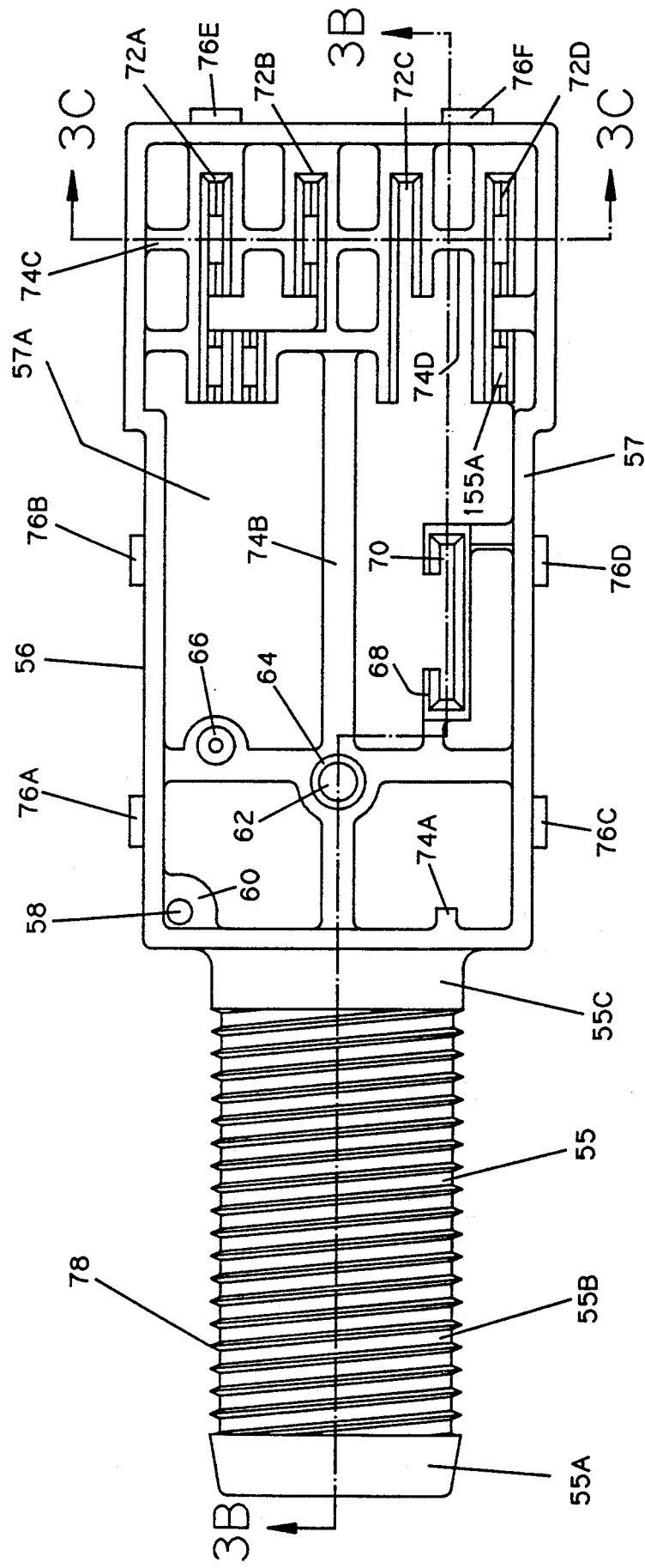
FIG. 3A is a top plan view of the vacuum brake switch housing body in FIG. 2.
Figure 3B:
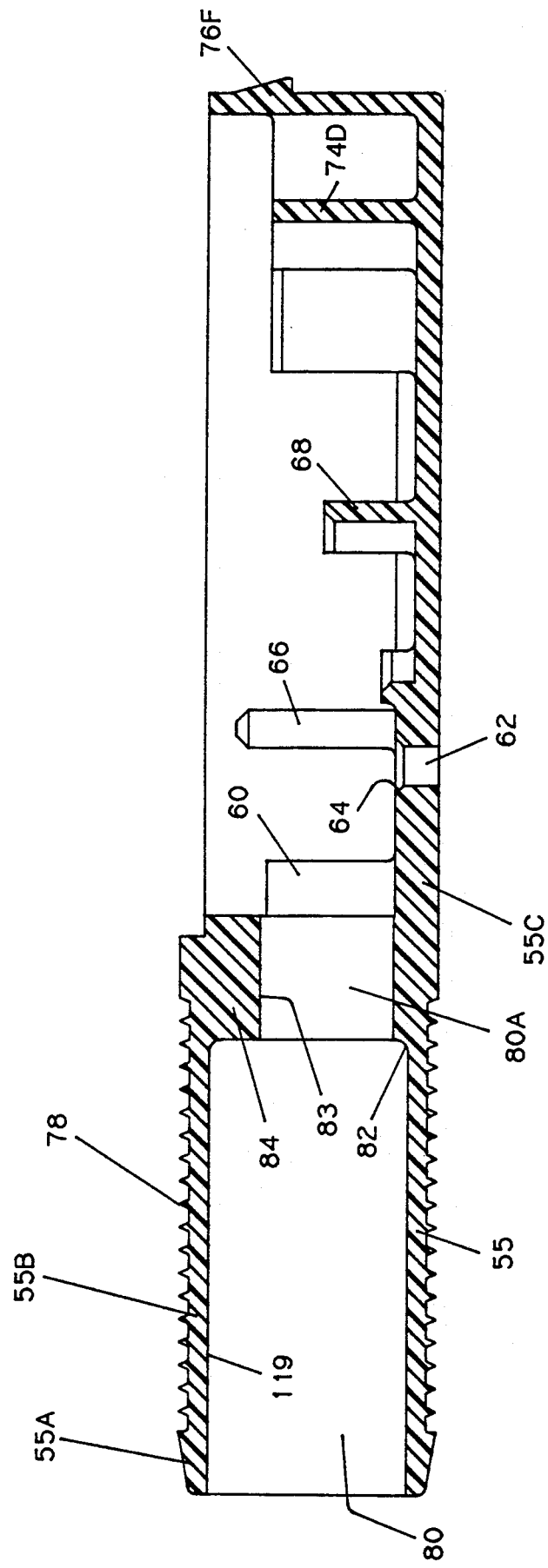
FIG. 3B is a cross-sectional view of the housing body taken through line 3B—3B of FIG. 3A.
Figure 3C:
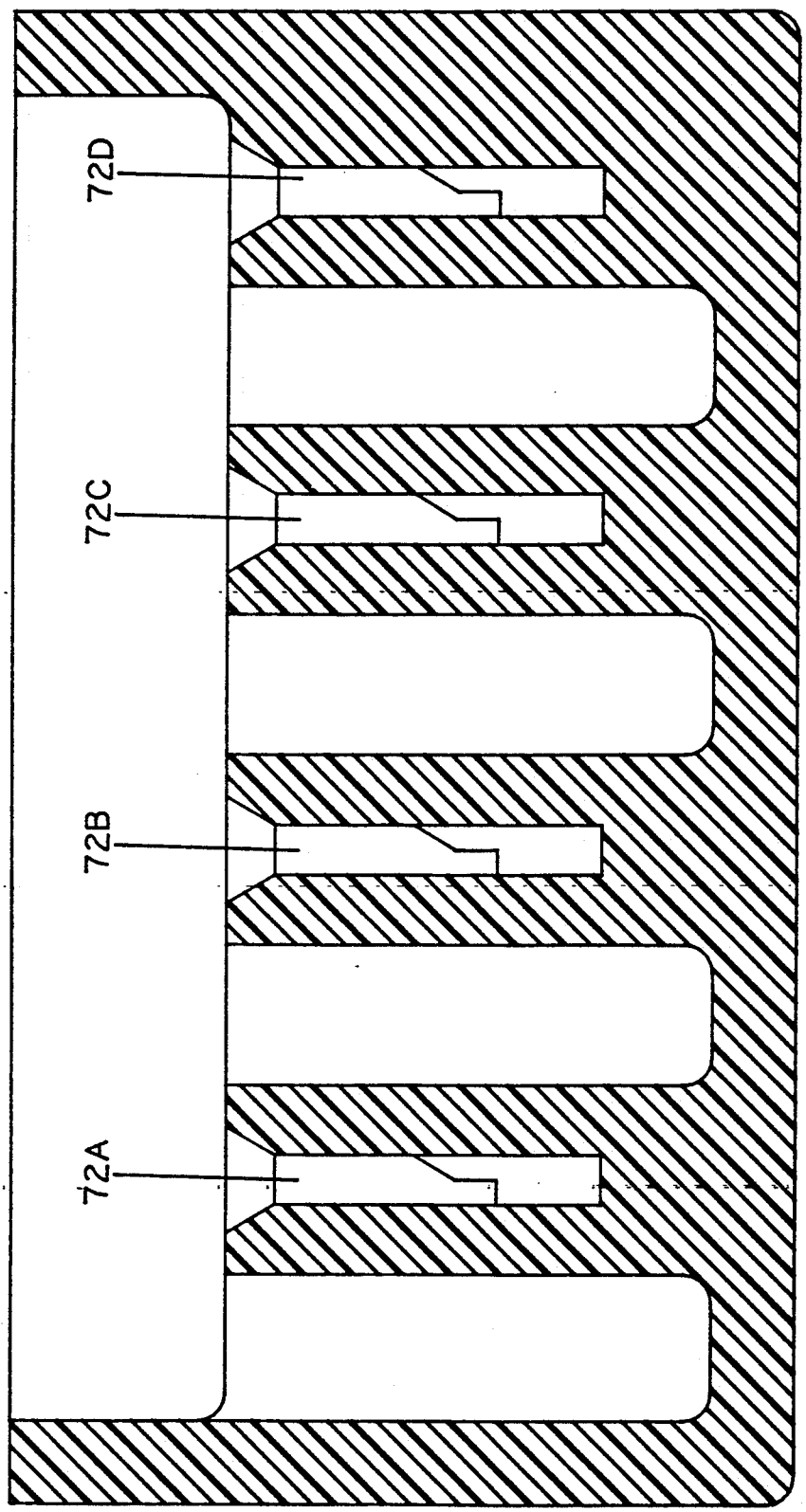
FIG. 3C is a cross-sectional view of the housing body taken through line 3C—3C of FIG. 3A.
Figure 3D:
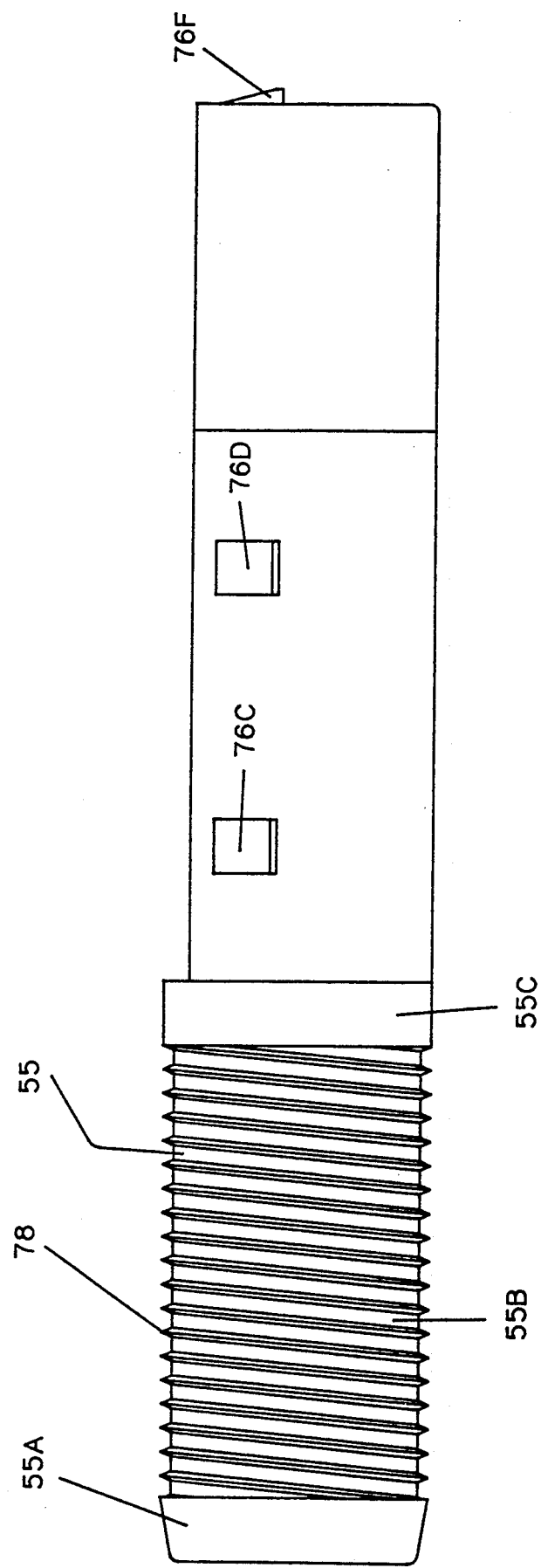
FIG. 3D is a side plan view of the housing body of FIG. 3A.
Figure 3E:
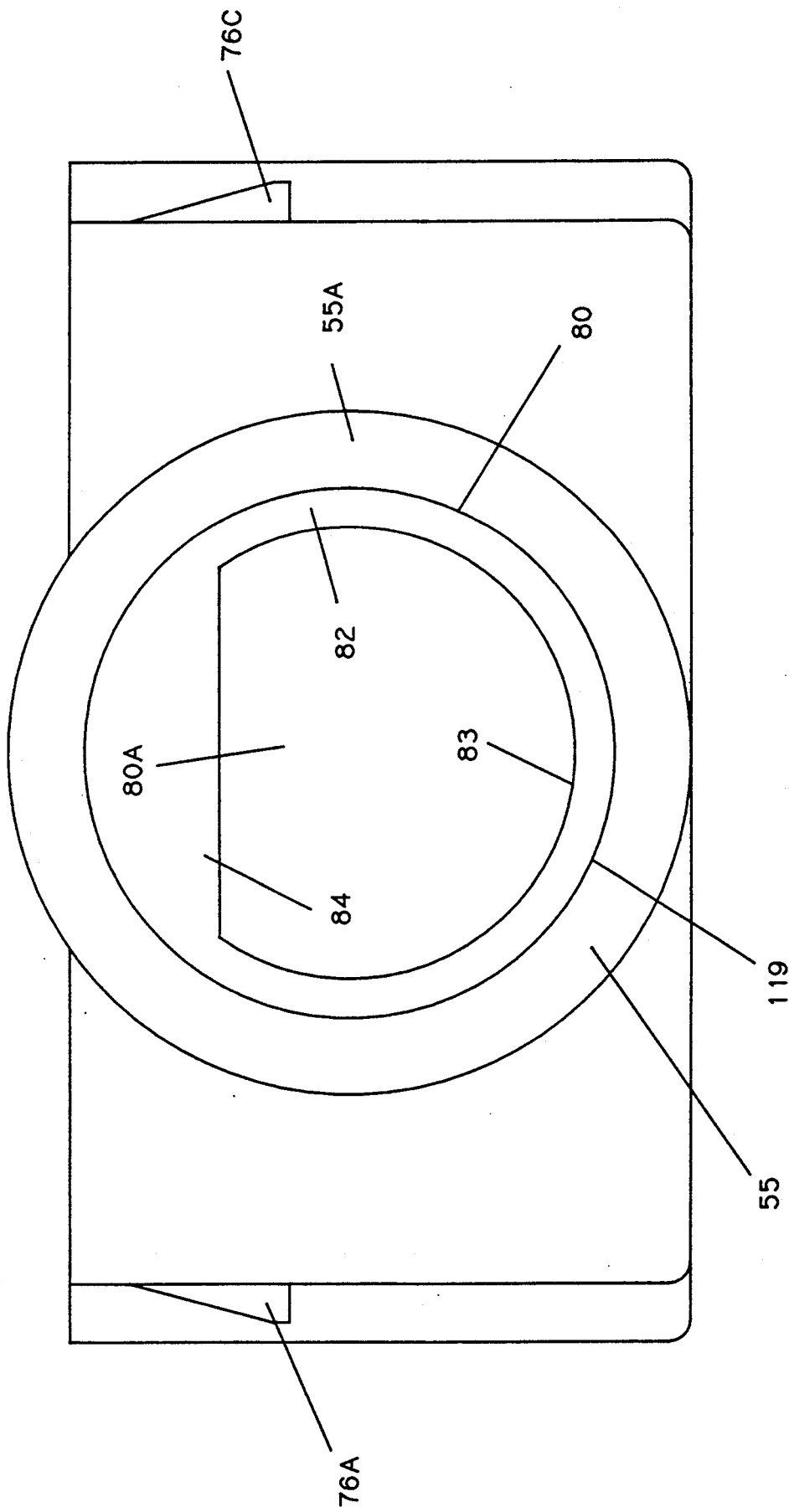
FIG. 3E is a front plan view of the housing body of FIG. 3A.

Turning now to a more detailed description of the various parts of the vacuum switch 22, the housing body 56 is shown in FIGS. 3A through 3E. A top, plan view of the housing body 56 is shown in FIG. 3A. Housing body 56 includes plunger housing 55 and switch housing 57. Switch housing 57 includes switch chamber 57A, housing vent 58, first baffle 60, plunger guide pin registration hole 62, which is surrounded by a chamber 64 to facilitate entry of the pin, bottom spring guide post 66 which is also chamfered at the top, stationary terminal front support 68 having slot 70 for receiving the stationary terminal 34B, and four slots, 72A through 72D, for receiving the top spring 34D, bottom spring 34C, stationary terminal 34B, and cam spring 34A respectively. The slots 72A through 72D are chamfered at their top ends (FIG. 3C). Housing 56 also includes ribs, such as 74A, 74B, 74C and 74D, for strengthening the housing and supporting the various slots, and six wedge-shaped studs 76A through 76F. The external portion of plunger housing 55 has a wedge-shaped front portion 55A, a threaded intermediate portion 55B having threads 78, and a rear portion 55C which is smoothly joined to switch housing 57. Internally, plunger housing 55 includes a plunger chamber 80 which is generally cylindrical in the forward portion and semicircular in the rearward portion portion 80A forming a shoulder 82 between them which provides a seat 82 for plunger spring 54. The portion 80A incudes a flat key 84 which keeps the plunger properly aligned about its axis of rotation and has a bearing surface 83 on which plunger 30 slides.

Figure 4A:
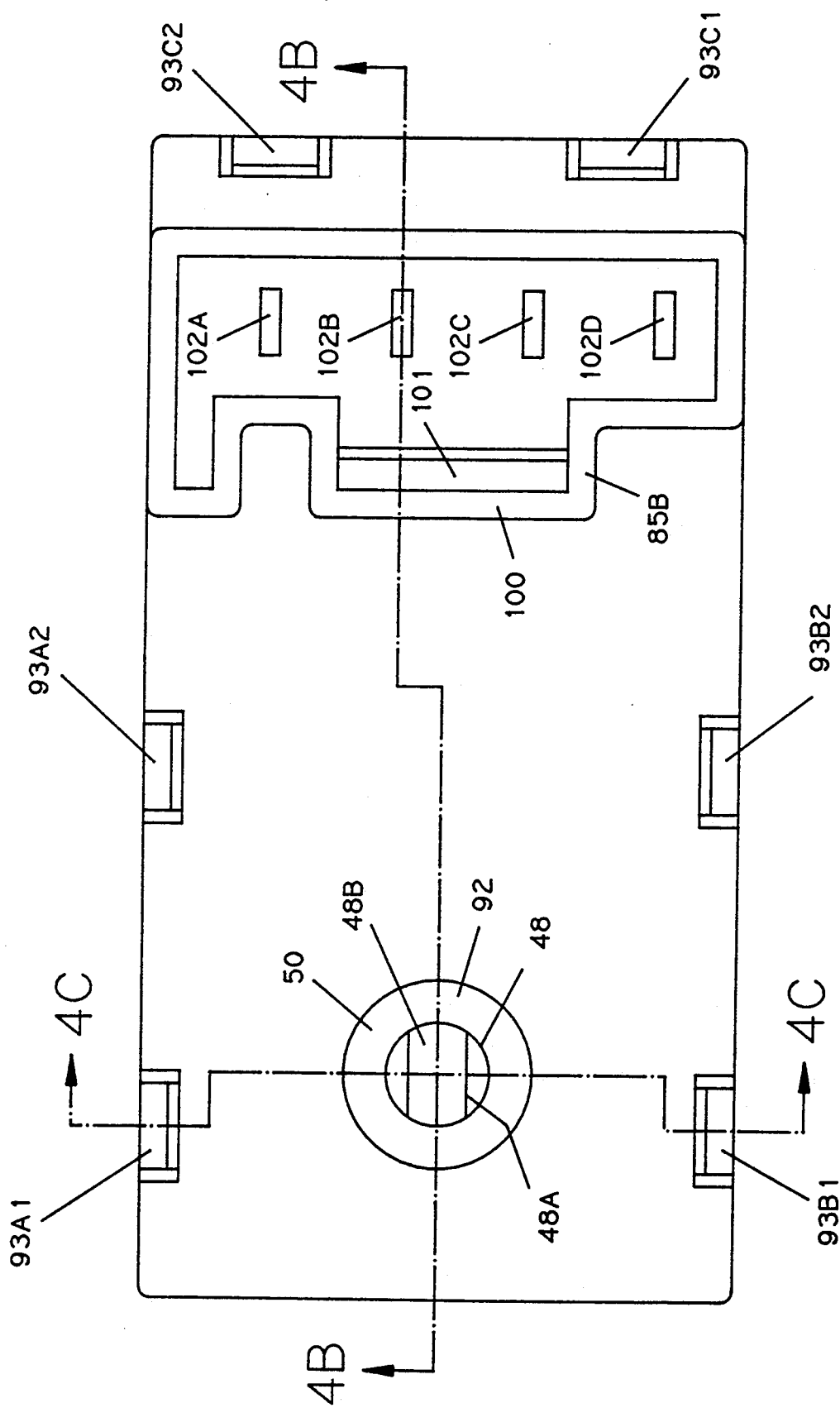
FIG. 4A is a top plan view of the housing cover of FIG. 2.
Figure 4B:
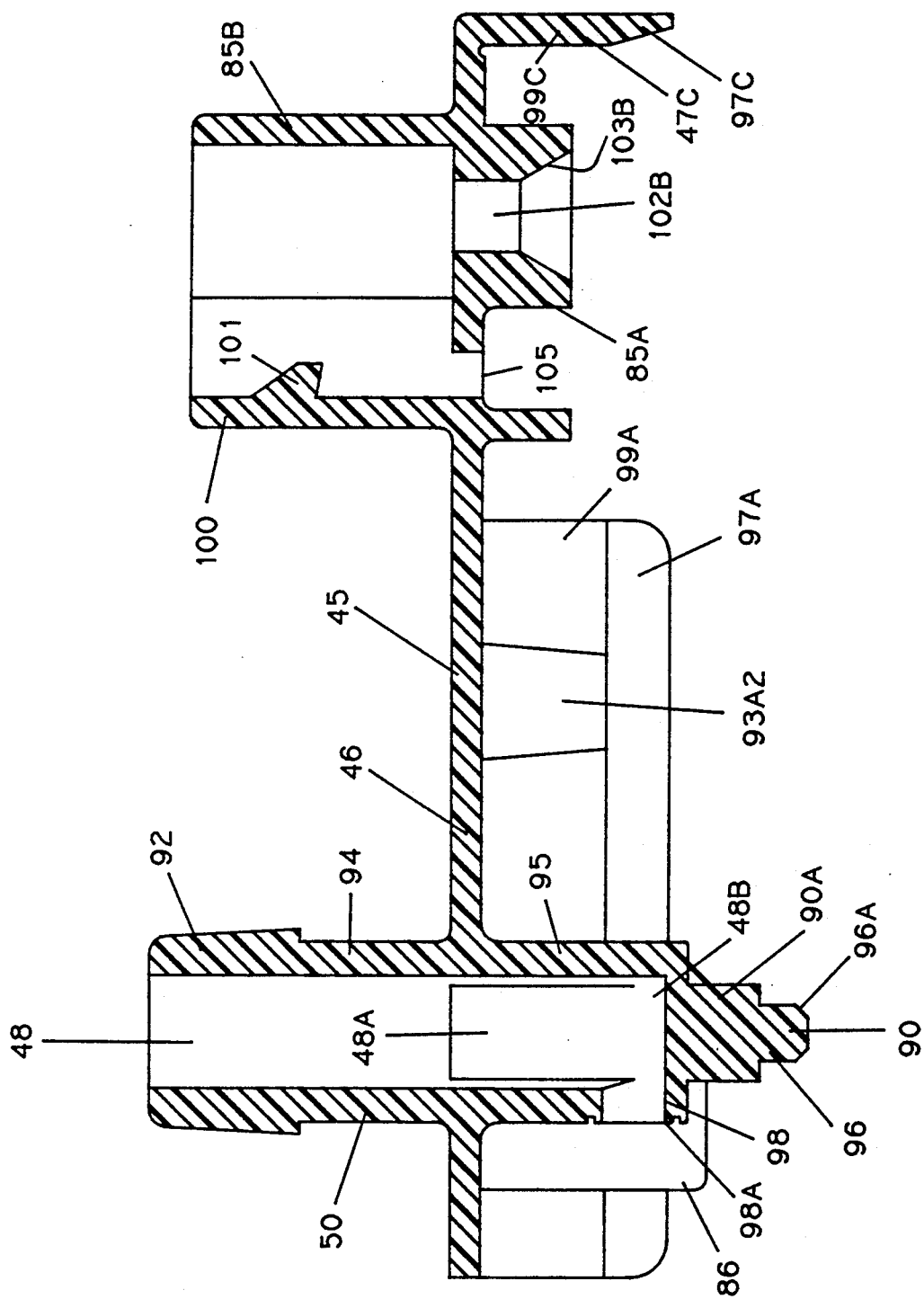
FIG. 4B is a cross-sectional view taken through lines 4B—4B of FIG. 4A.
Figure 4C:
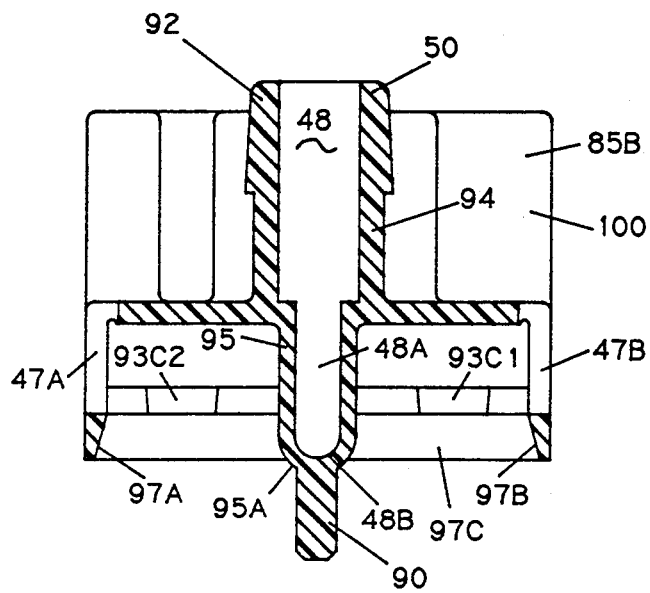
FIG. 4C is a cross-sectional view taken through lines 4C—4C of FIG. 4A.
Figure 4D:
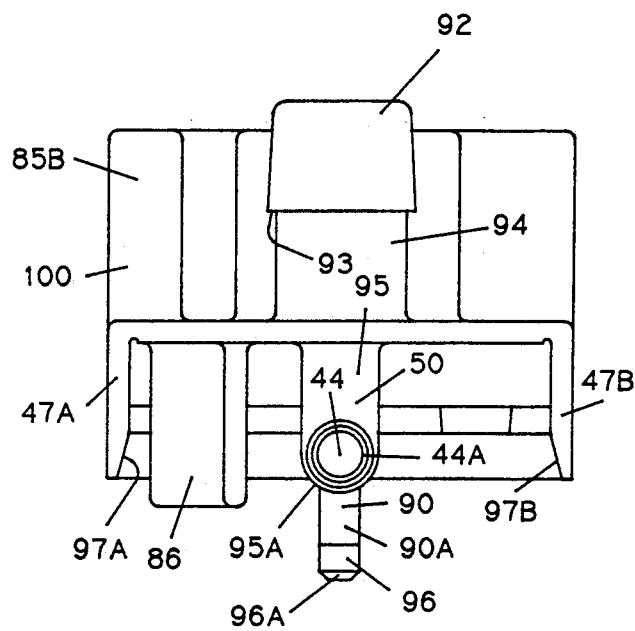
FIG. 4D is a front plan view of the housing cover of FIG. 4A.
Figure 4E:
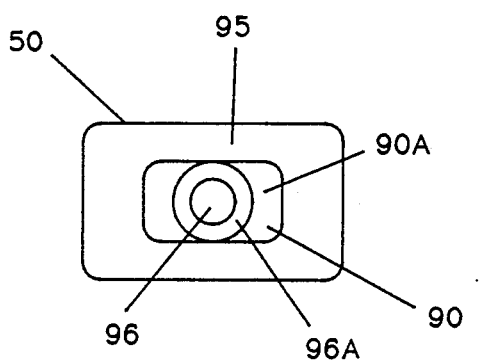
FIG. 4E is a detail of the vacuum passageway and plunger guide pin viewed from the bottom of the housing cover of FIG. 4A.
Figure 4F:
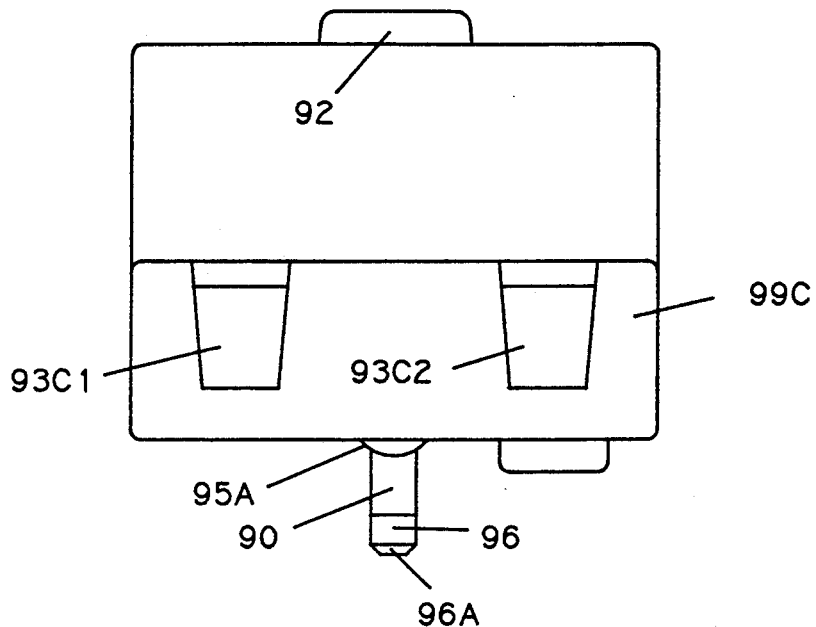
FIG. 4F is a rear view of the housing cover of FIG. 4A.
Figure 4G:
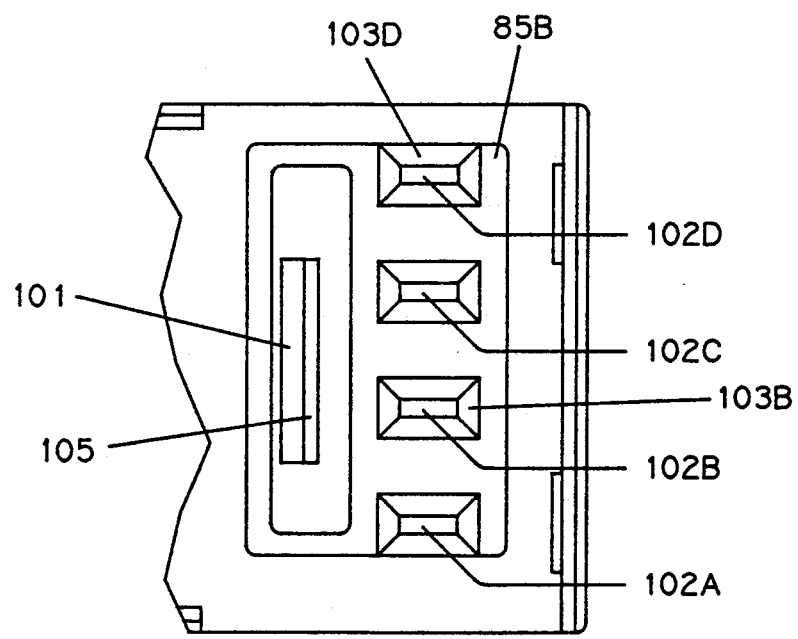
FIG. 4G is a bottom view of a portion of the housing cover of FIG. 4A showing the terminal slots.
Figure 5C:
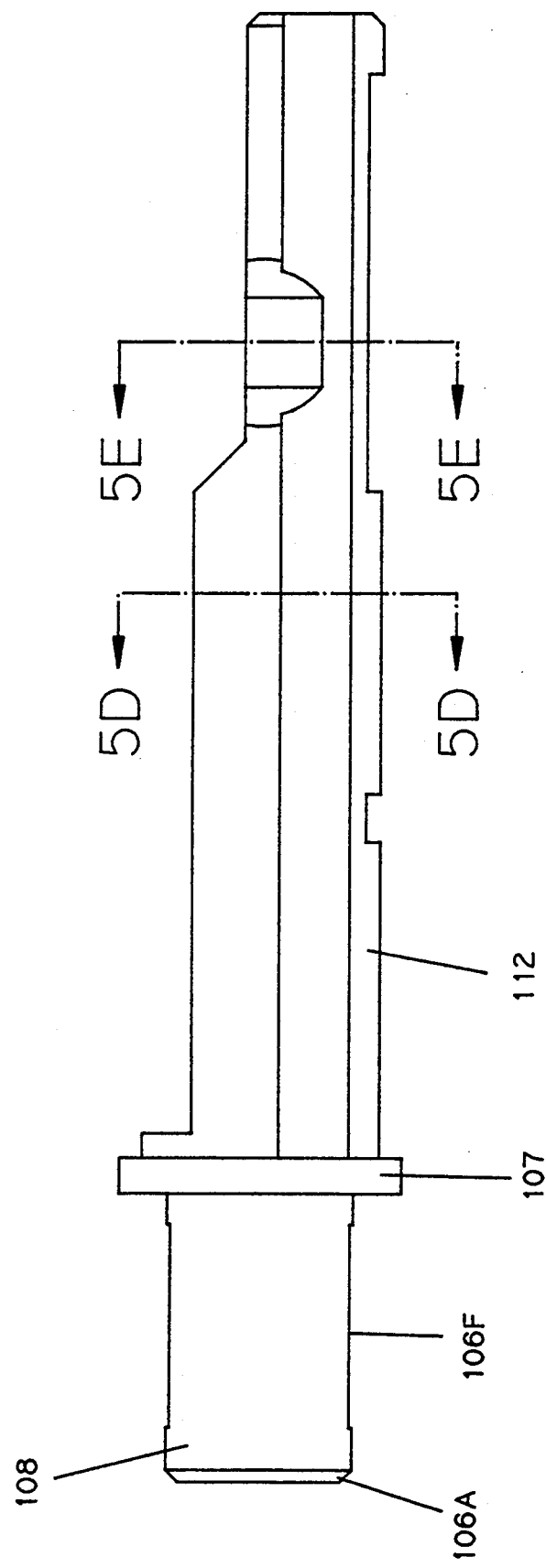
FIG. 5C is a side view of the plunger of FIG. 5A.
Figure 5D:
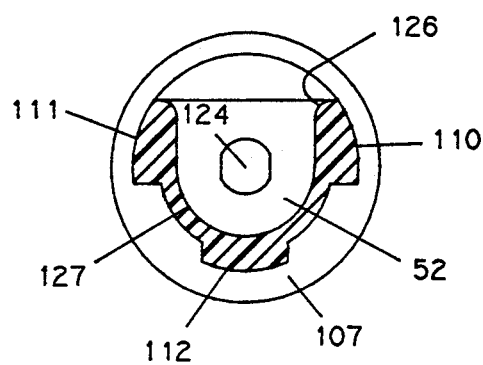
FIG. 5D is a cross-sectional view taken through lines 5D—5D of FIG. 5C.
Figure 5E:
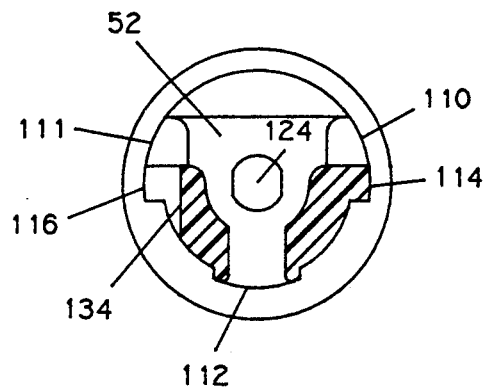
FIG. 5E is a cross-sectional view taken through lines 5E—5E of FIG. 5C.
Figure 5F:
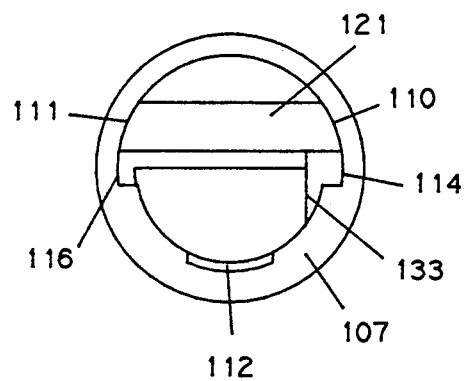
FIG. 5F is a rear view of the plunger of FIG. 5A.
Figure 5G:
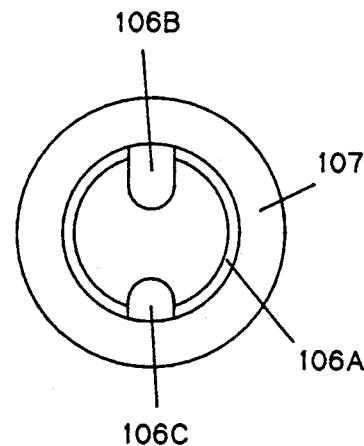
FIG. 5G is a front view of the plunger of FIG. 5A.

Turning now to FIGS. 4A through 4G, the housing cover 46 is shown. Housing cover 46 includes a plate 45, flanges 47A, 47B, and 47C, terminal support 85A and terminal insulator/connector 85B, second baffle 86, vacuum passageway 50, and plunger guide member 90 extending from the passageway 50, all of which are integrally molded in a single piece. Vacuum passageway 50 includes a nipple 92 and a cylindrical barrel 94 formed on the top of plate 45. Nipple 92 is rounded at the top, and generally cylindrical, though tapered outward slightly from top to bottom. Barrel 94 is of a smaller diameter than nipple 92 thereby forming a lip 93 where they join. Nipple 92 and barrel 94 provide a means for attaching a pliable tube (not show) to the passageway 50 to connect it to a device, such as a cruise control (not shown), which is to be controlled by the vacuum switch. Passageway 50 continues through plate 45 to a rectangular block 95 extending from the underside of plate 45 and terminating in a semicylindrical end 95A. The inner structure of passageway 50 includes a cylindrical portion 48 corresponding to the length of nipple 92 and barrel 94, and a rectangular portion 48A passing through plate 45 and block 95 and terminating in a semicylindrical end 48B. A short cylindrical vent hole 44 passes through the wall of block 96 and connects with the semicylindrical end 48B. The outer end of vent hole is 0.100 inches in diameter and finished in a 0.015/0.020 inch radius 44A which is highly polished and free of tool marks, flash and any other imperfections. Plunger guide member 90 extends from the end 95A of block 95. It includes a rectangular extension 90A and a cylindrical pin 96. Pin 96 is chamfered at its end 96A. Pin 96 is sized to fit snugly in pin registration hole 62 in housing body 56. Flanges 47A, 47B, and 47C each comprise a generally rectangular portion, such as 99A (FIG. 4B) or 99C, and a wedge-shaped portion, such as 97A or 97C. Each also include a pair of tapered slots, 93A1, 93A2, 93B1, 93B2, and 93C1 and 93C2 (FIGS. 4A and 4F). The wedged-shaped portion, such as 97C, assists the flange in sliding over housing body 56 and studs 76A through 76F as cover 46 is urged onto the housing body 56. Slots, such as 93A1, are shaped so as to snap over studs, such as 76A, to hold the housing cover 46 securely to housing body 56. Terminal insulator/connector 85B includes an irregularly-shaped box 100 which is adapted to made with a similarly shaped connector (not shown), and a wedge-shaped lip 101 which is adapted to permit a tongue (not shown) on the connector to snap over it. Terminal support 85A comprises a rectangular block molded on the underside of plate 45. Four slots 102A through 102D pass through support 85A and plate 45 into the insulator/connector box 100. Each slot is sloped on all four sides, such as at 103B and 103D (FIGS. 4B and 4G) to facilitate the entry of terminals into the slots. Slot 105 is for manufacturing purposes to permit the molding of lip 101 and its removal from the mold.

Plunger 30 is a single integrally molded, generally cylindrical member 30 and is shown in FIGS. 5A through 5G. It includes stem 108, collar 107, sealing member channel 52, guide slot 109, bearing surfaces 110, 111, and 112, and cam surfaces 114 and 116. Stem 108 is generally cylindrical, camfered at its end 106A, has two u-shaped slots 106B and 106C adapted to mate with a standard coupling, and cavities 106D, 106E and 106F to decrease the material in it. Collar 107 is disk-shaped and of suitable dimensions to slide easily without play in the front portion of plunger chamber 80 with bearing surface 118 sliding on the plunger chamber wall 119 (FIG. 3B). Another disk-shaped surface 122 lies adjacent collar 107. This surface is of the same diameter as the bearing surfaces 110, 111, and 112 that follow it and is of smaller diameter than collar 107, thereby forming plunger spring seat 122A. Cavity 117 is intended to decrease the amount of material in the plunger. Post 120 and wall 121 separate cavity 117 from channel 52. Wall 121 provides a seat for spring 40 to bear against and post 120 braces the wall 121. Spring registration stud 124 is formed on wall 124. Slot 125 is a manufacturing element to permit the molding of stud 124. Channel 52 is u-shaped (best seen in FIG. 5D) and tapered outward at its upper end 126 to more smoothly receive sealing member 41. Its semi-cylindrical lower surface is dimensioned to permit sealing member 41 to slide easily in it without side-to side play. A channel 130 which is narrower than channel 52 is formed at the rear of plunger 30 with the shoulder 129 formed at the juncture of channels 52 and 130 providing a stop for sealing member 41. The sides, such as 131 of channel 130 are smoothly curved to ease entry of pin 96 into slot 109. Bearing surfaces 110, 111, and 112 are portions of an arc of a cylinder and are sized and located to facilitate easy sliding of plunger 30 on bearing surface 83 without side-to-side play. Cam surfaces 114 and 116 are extensions of bearing surfaces 110 and 111 respectively, except that they subtend only about $\frac{1}{2}$ to $\frac{1}{3}$ the cylindrical arc of the bearing surfaces. Their arcs extend about 0.030 inches on either side of a horizontal diameter cutting the midline of the plunger 30. Cam surface 114 has a drop 133 formed near its rear end, and cam surface has a drop 134 formed near its front end. Refering to FIG. 5A, plunger 30 is preferably 2.432 inches long and the surface of drop 133 where it meets slope 136 begins about 2.243 inches from its front end. Drop surface 134 is about 0.150 inches long and its rear end where it meets slope 138 is about 1.964 inches from the front end of plunger 130. The sides 136, 137 and 138 of the drops 133 and 134 slope at about 45 degrees. The outer diameter of the bearing surfaces 110 and 111 is about 0.395 inches, while the surfaces 133 and 134 are flat and are located about 0.133 inches from the centerline of the plunger 130. Slot 109 is rounded at its ends and is sized so that rectanguar extension 90A slides easily in it without side-to-side play.

Turning to FIGS. 6A and 6B, the sealing member 41 is shown. It preferably includes a relatively rigid body 140 and a relatively flexible sealing tip 42. Body 140 includes a hollow cylinder 142 which is closed at one end, forming seat 143 for spring 40, and has a narrower cylindrical neck 145. The hollow 147 may be drilled leaving a small cone-shaped indentation 148. The open end is chamfered at 146. Body 140 is preferably made of 360 brass. Cylinder 142 preferably has an outer diameter of about 0.232 inches, an inner diameter of 0.171 inches, and is about 0.425 inches long. Neck 145 is about 0.165 inches in diameter. Sealing tip 42 is preferably cone-shaped with a 35 degree slope. It is preferably made of nitrile plastic.

Valve spring 40 is preferably a coil spring having a free length of 0.750 inches an inside diameter of 0.110 inches, an outside diameter of 0.160 inches and made of tin coated music wire. It preferably has a load factor of 3.0 oz. at 0.575 inches extension and its working length is 0.355 inches. Plunger return spring spring 54 is preferably a coil spring having a free length of about 2.00 inches, an inside diameter of about 0.402 inches, an outside diameter of about 0.468 inches, and made of tin coated music wire. It preferably has a load factor of about 17 oz. at 0.565 inches extension, its working length. It is chosen so as to easily slide on plunger 30 about surfaces 122, 110, 111, and 112 and within plunger chamber 80 without significant side-to-side play.

Figure 9A:
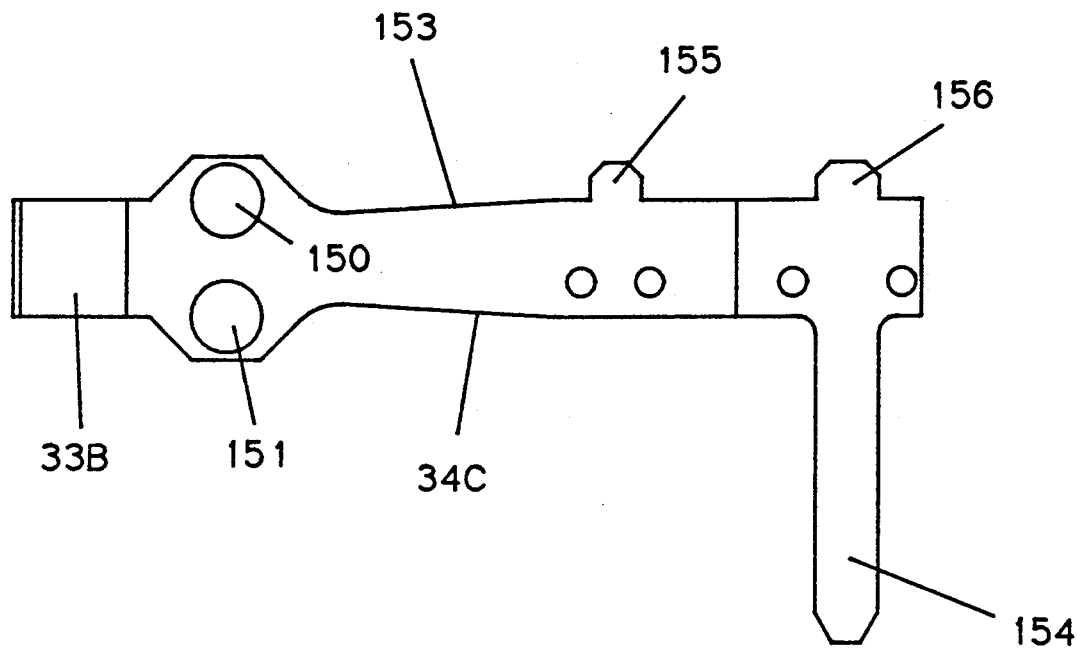
FIGS. 9A and 9B show side and top plan views respectively of the bottom spring of FIG. 2.
Figure 9B:
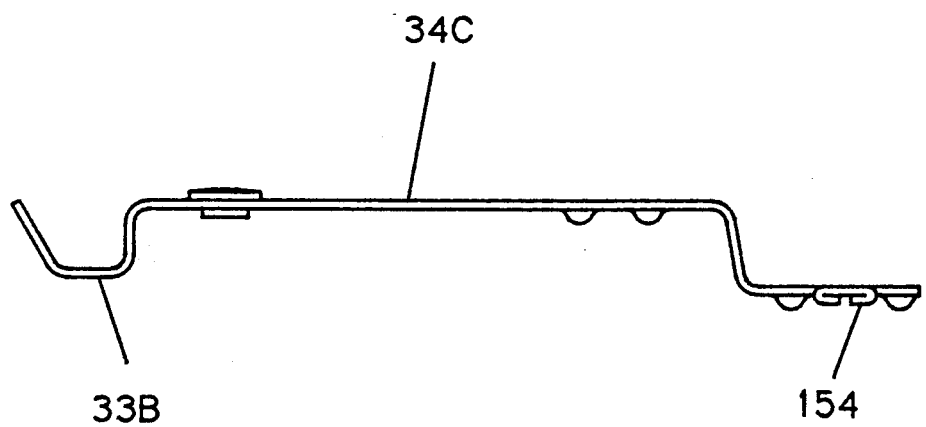

Bottom spring 34C is shown in FIGS. 9A and 9B. It has two contacts 150 and 151, a single spring arm 153, terminal 154, tabs 155 and 156, and cam follower 33B.

Figure 10A:
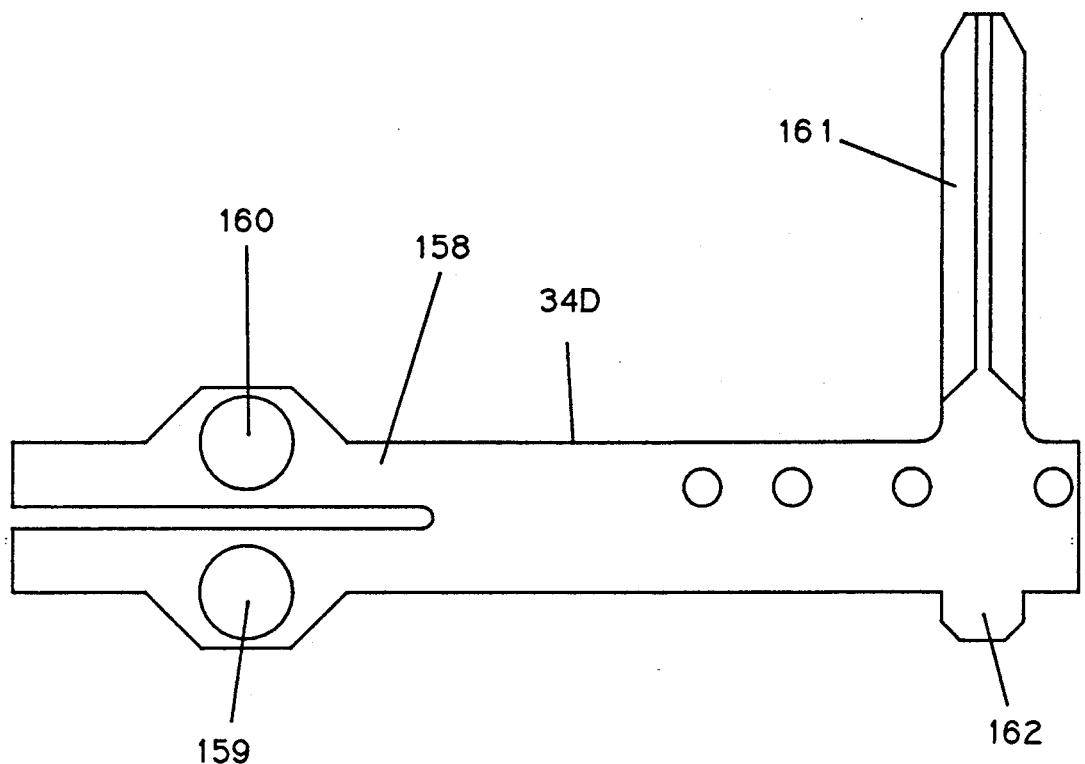
FIGS. 10A and 10B show side and top plan views respectively of the top spring of FIG. 2.
Figure 10B:
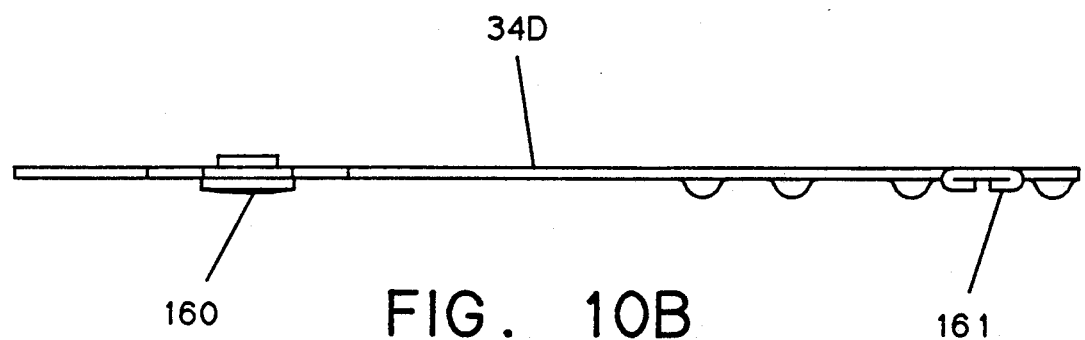
Figure 10C:
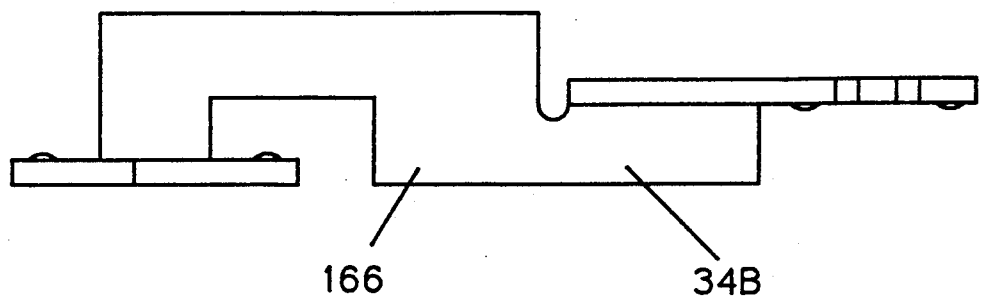
FIGS. 10C and 10D show top and side plan views respectively of the stationary terminal of FIG. 2.
Figure 10D:
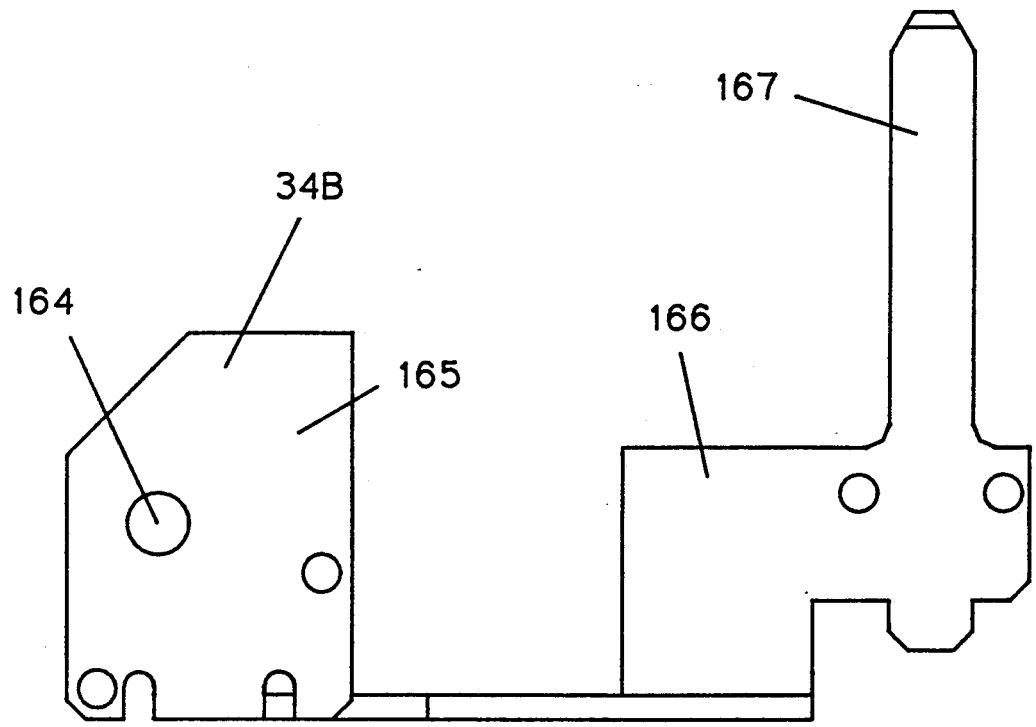
Figure 11A:
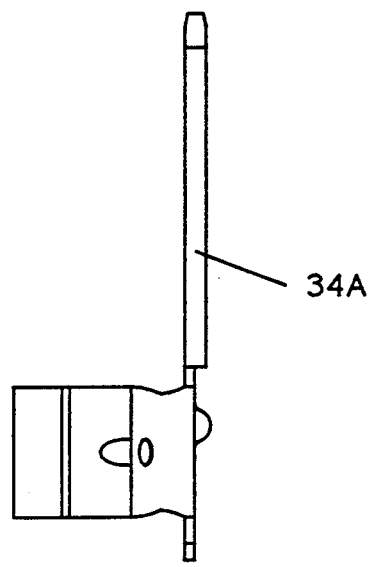
FIGS. 11A, 11B, and 11C show front, side and top views respectively of the cam spring of FIG. 2.
Figure 11B:
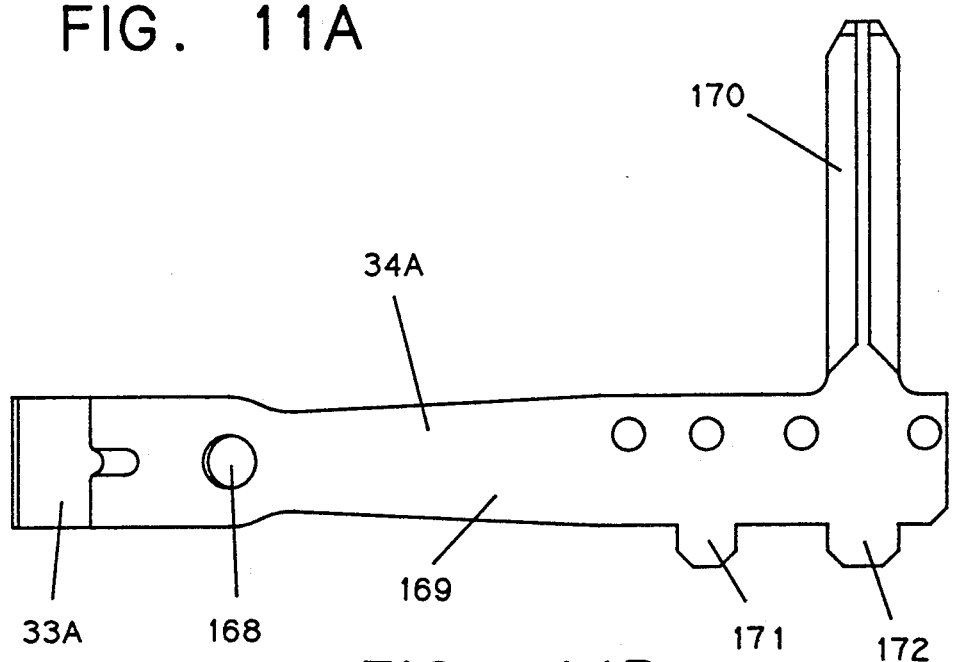
Figure 11C:
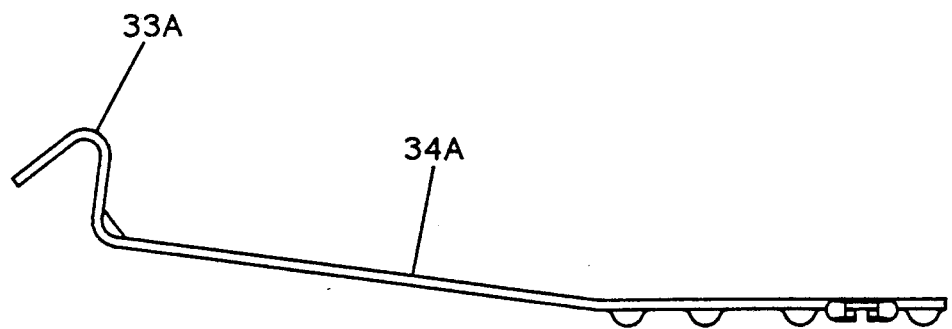

Top spring 34D is shown in FIGS. 10A and 10B. It has a bifurcated spring arm 158, two contacts 159 and 160, terminal 161, and tab 162. Stationary terminal 34B is shown in FIGS. 10C and 10D. It has a single contact 164 mounted on a contact plate 165, an s-shaped connecting arm 166, and terminal 167 integrally formed with terminal plate 166. Cam spring 34A is shown in FIGS. 11A through 11C. It has a single contact 168, spring arm 169, terminal 170, tabs 171 and 172, and cam follower 33A.

Preferably the springs 34A, 34C, and 34D and stationary terminal 34B are made of brass, pereferably 260 CDA, half hard. Housing body 56 is preferably made of nylon 6/6–15% glass, 25% mineral filled, of natural color, while housing cover 46 is preferably made of nylon 6/6–40% mineral filled, colored black. Plunger 30 is made of any suitable hard plastic with lubricity, such as teflon filled nylon. Mounting clip 26 is preferably made of acetal plastic. Cover 46, body 56, and plunger 30 are preferably each integrally molded.

Figure 12:
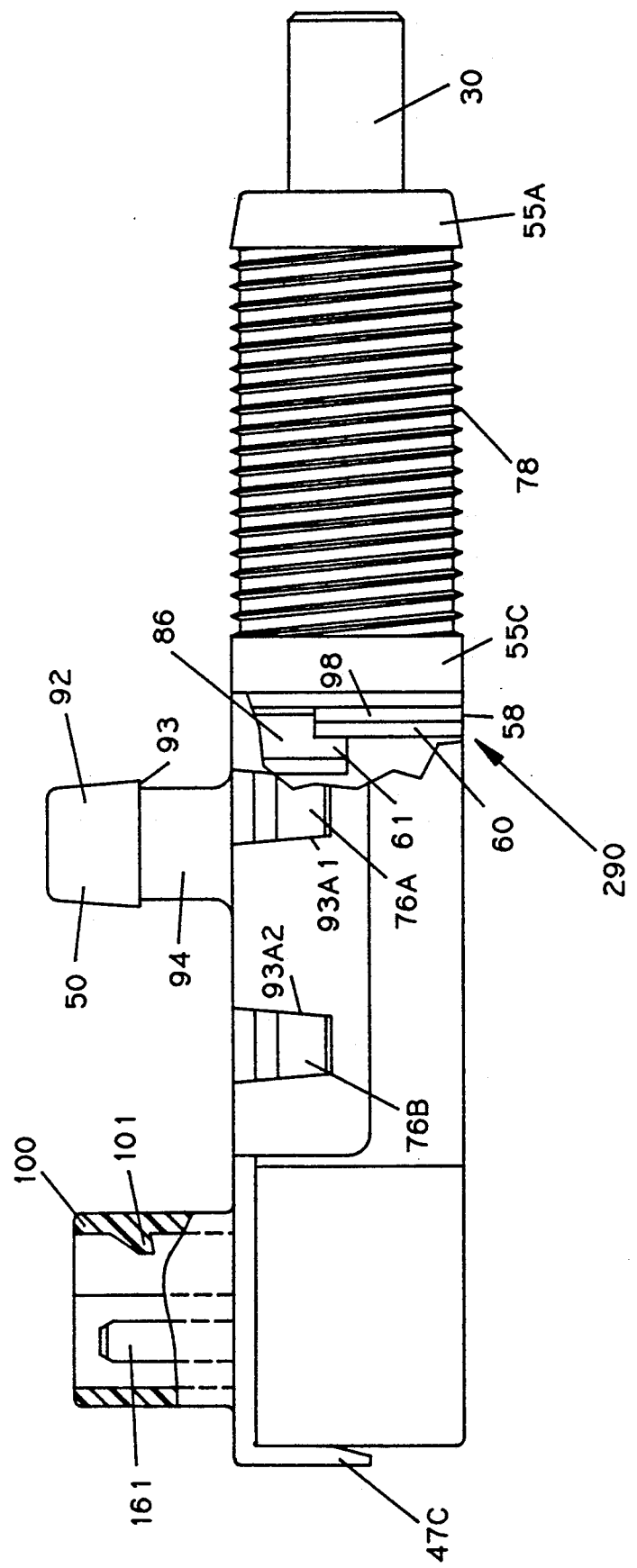
FIG. 12 shows a partially cut away side plan view of the vacuum switch housing of FIGS. 1 and 2.

The vacuum switch 22 is assembled as follows. Springs and terminal 34A through 34D are placed in slots 72D, 72C, 72B and 72A respectively with their respective tabs, such as 155 entering the respective tab slot, such as 155A. Plate 165 of stationary terminal 34B is at the same time pressed into slot 70 and top spring 34D is placed to the top side of post 66 in FIG. 3A. Valve spring 40 is then placed in hollow 147 of cylinder 142 of sealing member 41 and over stud 124 of plunger 30, and sealing member 41 is placed in channel 52 with shoulder 144 of sealing member 41 bearing against shoulder 129 of plunger 30, compressing spring 40 to hold the sealing member in channel 52. Plunger return spring 54 is then slid over the rear end of plunger 30 over surfaces 110, 111, 112 and 122 to seat against seat 122A, the plunger 30 and spring 54 are slid into plunger chamber 80, the spring 54 is compressed by pushing plunger 30 into the chamber 80 until slot 109 is centered over hole 62 in housing body 56, and then housing cover 46 is placed on housing body 56 with terminals 161, 154, 167, and 170 passing through slots 102A, 102B, 102C, and 102D respectively, pin 96 passing through slot 109 into hole 62 and extension 90A sliding into slot 109, and slots 93A1, 93A2, 93B1, 93B2, 93C1, and 93C2 snapping over studs 76A, 76B, 76C, 76D, 76F and 76E respectively. Plunger 30 may then be released with extension 90A holding it in the housing 56 with spring 54 compressed between seat 82 in housing body 56 and seat 122A on plunger 30 thereby holding plunger 30 under tension. The assembled vacuum switch is shown in FIG. 12.

Figure 13A:
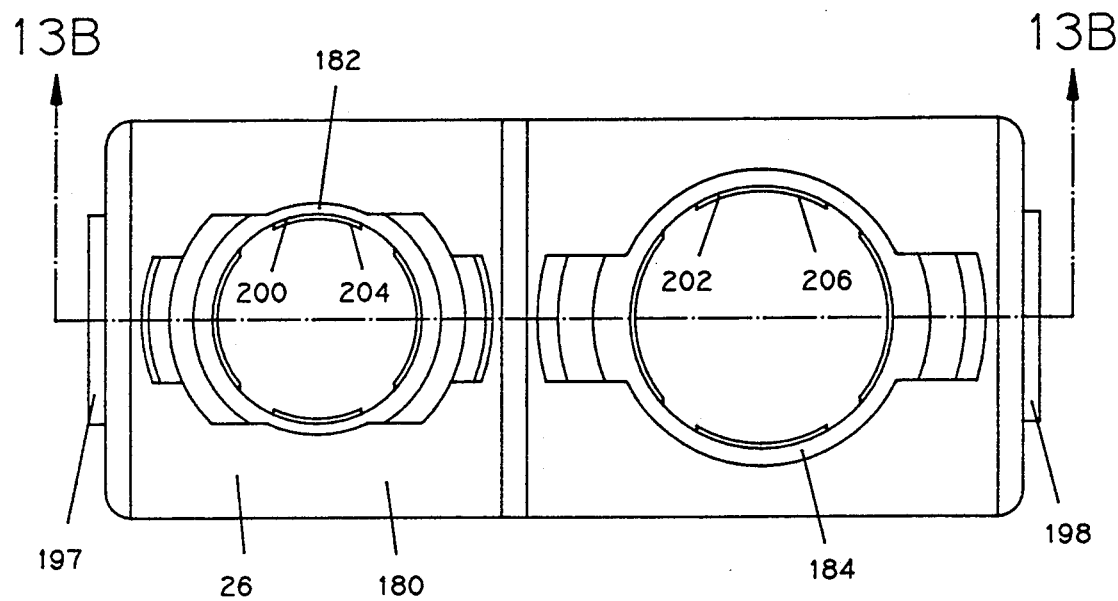
FIG. 13A shows a front plan view of the mounting clip of FIG. 1.
Figure 13B:
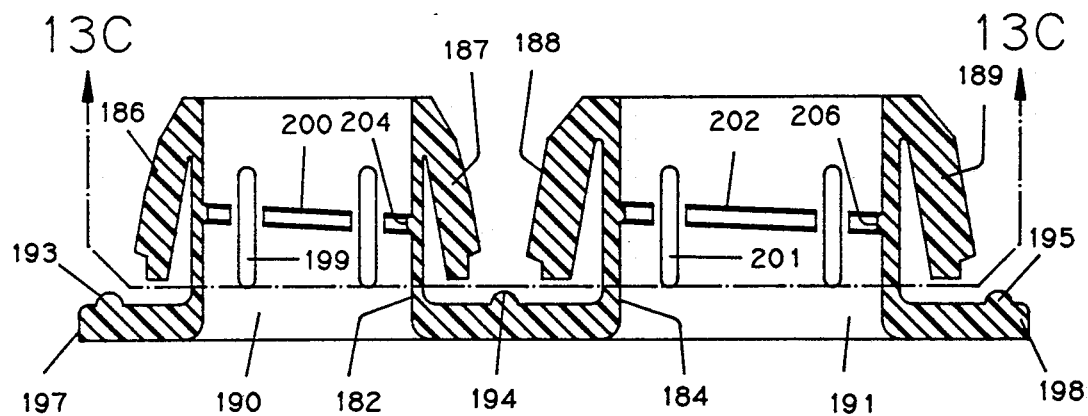
FIG. 13B is a cross-sectional view taken through lines 13B—13B of FIG. 13A.
Figure 13C:
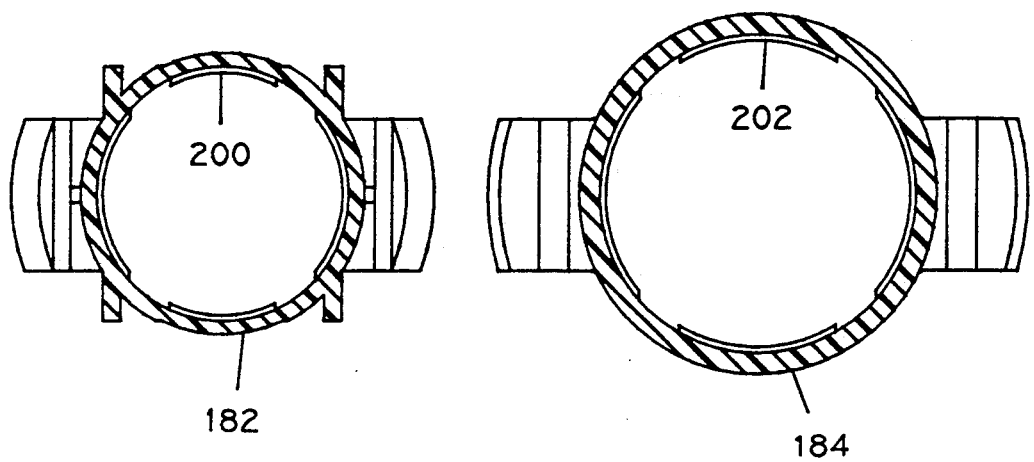
FIG. 13C is a cross-sectional view taken through lines 13C—13C of FIG. 13B.
Figure 13D:
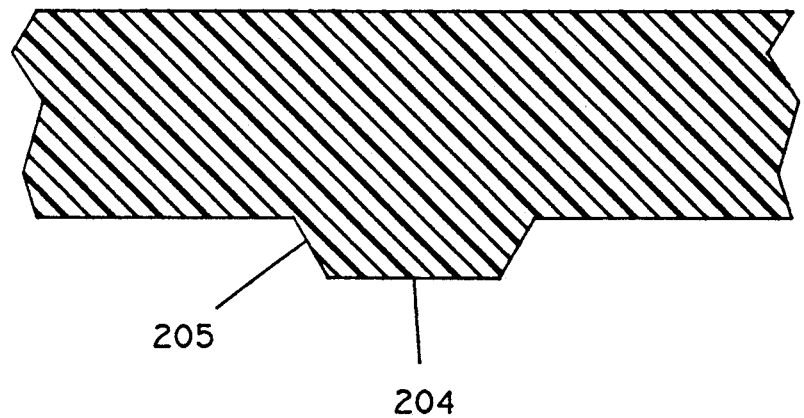
FIG. 13D is a detail of portion of FIG. 13B showing a tooth of the mounting clip of FIG. 13A.

Turning now to a detailed description of mounting clip 26 shown in FIGS. 13A through 13D. Mounting clip 26 includes plate 180, hollow cylindrical sleeves 182 and 184, and locking ears 186, 187, 188, and 189. The bores 190 and 191 of sleeves 182 and 184 respectively pass through plate 180 also. Plate 180 is rectangular, preferably about 0.950 inches by 2.195 inches, and has three semi-cylindrical ribs 193, 194, and 195, of about 0.065 inches diameter, running across the narrower dimension on the front surface, ribs 193 and 195 at each of the two ends and rib 194 between sleeves 182 and 184. Flanges 197 and 198 extend about 0.04 inches from either end. Sleeve 182 is about 0.502 inches inner diameter and 0.555 inches outer diameter in the vertical direction in FIG. 13C and 0.565 inches in the horizontal direction, while sleeve 184 is about 0.628 inches inner diameter and 0.710 inches outer diameter. Each sleeve 182 and 184 has four slots, such as 199, that are each about 0.040 inches wide by 0.165 inches long with radiused ends. The slots, such as 199, in sleeve 182 are spaced about 0.125 inches from the vertical centerline of the sleeve in FIG. 13B, and the slots, such as 201, in sleeve 184 are spaced about 0.175 inches from the vertical centerline of sleeve 184 in the same FIG. Each sleeve 182 and 184 has a tooth 200 and 202 respectively which is broken into four teeth by the slots. Each tooth 200, 202 is formed about the inner circumference of the respective sleeve 182, 184, following an appropriate line to mate with the threads 240, 78 on plunger housings 232 and 32 respectively, and approximately centrally located with respect to the ends of the sleeve. Surface 204 has a diameter of about 0.478 inches. The shape of tooth 200 is shown in FIG. 13D. It is about 0.030 inches wide (the horizontal direction in FIG. 13D) and the edges., such as 205 slope at 60 degrees. Surface 206 of tooth 202 has a diameter of 0.604 inches and a width of 0.034 inches with the sides sloped at the same 60 degree angle. Ear 186 is about 0.088 inches thick at its thickest point and its outer and inner surfaces slope at about 15 degrees and 10 degrees respectively from the vertical, and ear 187 is similar. Ear 188 has the same slopes but is about 0.112 inches thick at its thickest point.

Figure 14:
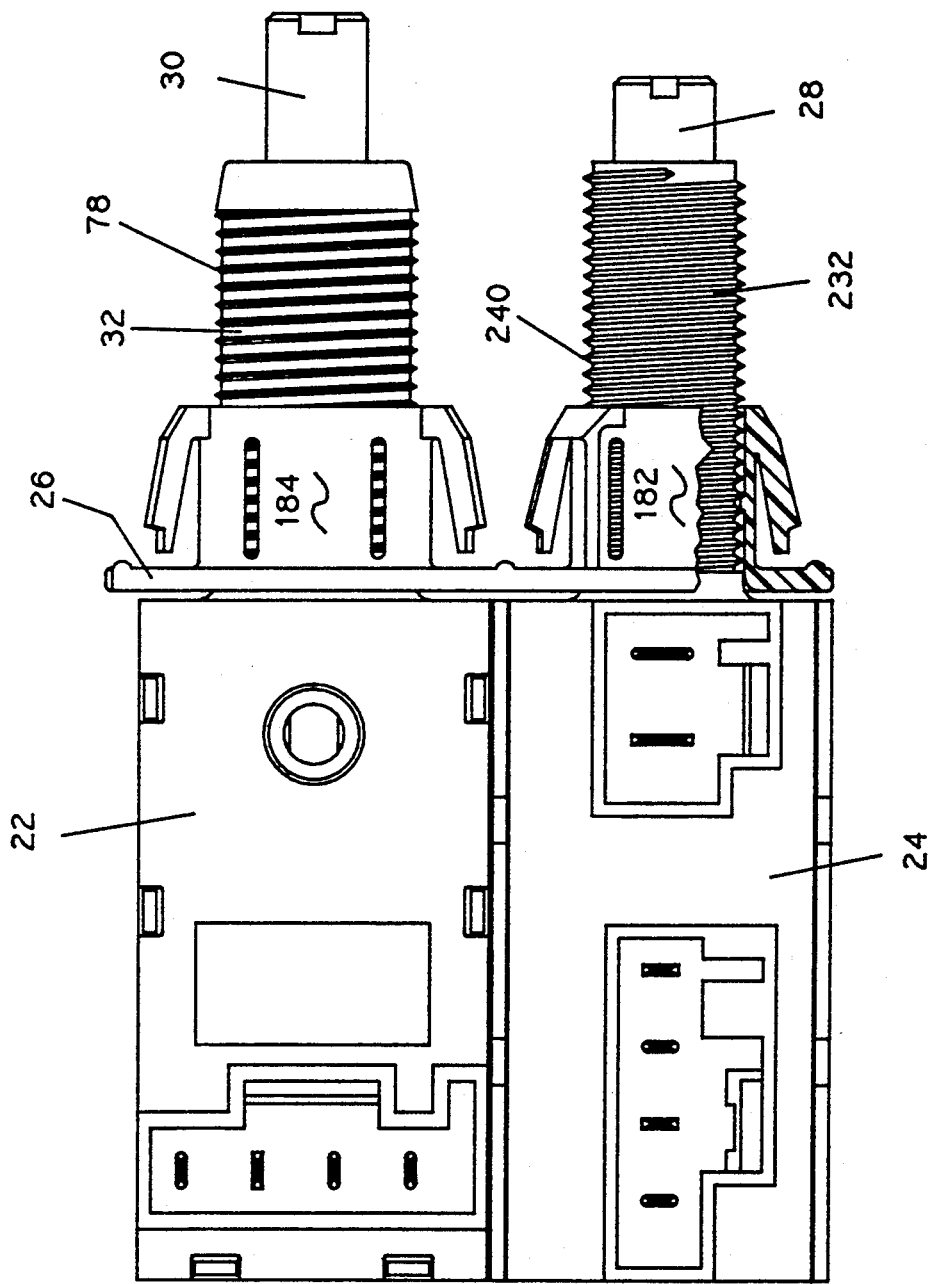
FIG. 14 a partially cut away top plan view of the assembled automobile brake switch assembly of FIG. 1.
Figure 15:
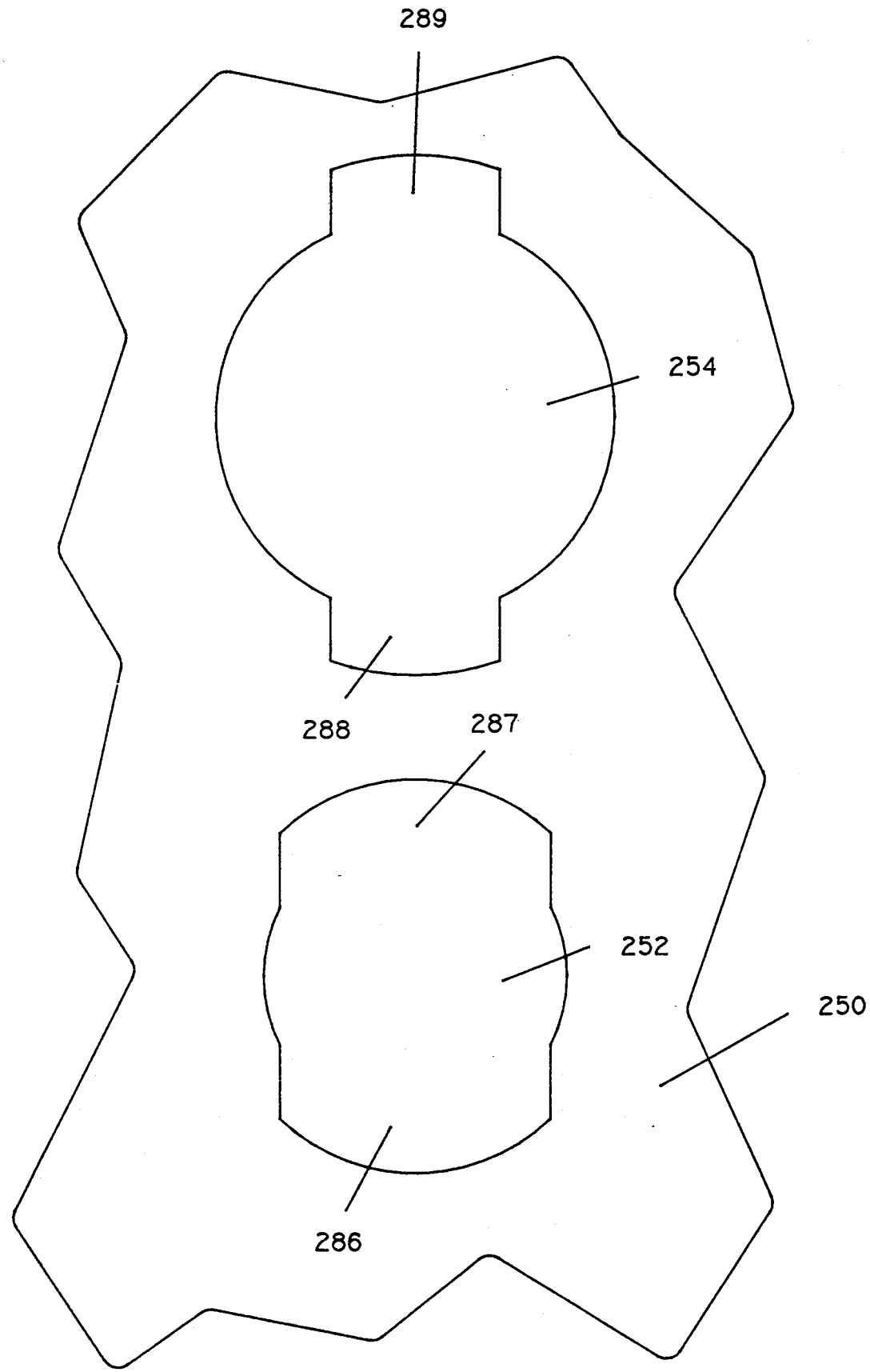
FIG. 15 shows the mounting holes in automobile brake pedal bracket in which the the assembly of FIG. 14 may be mounted.

FIG. 14 shows vacuum switch 22 and triple acting switch 24 mounted in mounting clip 26. The plunger housing 32 of vacuum switch 22 has a ⅜-18 UNF 2A thread 78 while the plunger housing 232 of triple acting switch 24 has a ½-20 UNF 2A thread 240. FIG. 15 shows a pedal bracket 250 of an automobile on which the mounting clip 26 holding switches 22 and 24 may be mounted. It contains holes 252 and 254. Hole 252 is shaped for receiving sleeve 182, with ears 186 and 187 snapping into notches 286 and 287 respectively, and hole 254 is shaped for receiving sleeve 184 with ears 188 and 189 snapping into notches 288 and 289 respectively.

Vacuum switch 22 and triple acting switch 24 are preferably mounted in an automobile as follows. Plunger housing 32 of vacuum switch 22 is screwed into sleeve 184 while plunger housing 232 of triple acting switch 24 is screwed into sleeve 182. Alternatively, the plunger housings 32 and 232 may be pressed into sleeves 184 and 182 respectivly with the slots, such as 199 and 201, permitting the sleeves to expand sufficiently to permit threads 78 to ratchet on teeth 202 and threads 248 to ratchet on teeth 200. The plunger housings 32 and 232 are preferably threaded or pressed all the way into their respective sleeves 184 and 182 respectively as shown in FIG. 14. With the brake pedal (not shown) pressed down, the mounting clip 26 is then pressed into the pedal bracket 250 of the automobile. The brake pedal (not shown) is then released and the brake lever (not shown) to which it is attached presses against plungers 28 and 30, pressing them all the way into their respective housings 32 and 232 and then ratcheting the plunger housings 32 and 232 partially trough sleeves 184 and 182 respectively until the brake lever hits its stop. The switches 22 and 24 will then activate properly when the brake pedal is again pushed.

It is noted that teeth 200 and 202 do not press into threads 240 and 78 and yet plunger housings 232 and 32 are firmly gripped by the clip 26. This is possible because the inner diameter of sleeves 182 and 184 is just a few hundredths of an inch larger than the outer diameter of the threads 240 and 78 of the respective plunger housings 232 and 32 and thus substantial support is provided by sleeves 182 and 184 as well as the teeth 200 and 202.

As indicated above, the vacuum brake switch 22 is designed to have the plunger 30 completely pushed into plunger housing 32 when the brake pedal is not depressed. In this position, cam follower 33A is in drop 134 in cam surface 116 causing switch 36A to be closed, and cam follower 33B is on the raised portion 114A of cam surface 114 causing switch 36B to be closed also. Further, in this position, sealing tip 42 is seated in vent hole 44, and plunger shoulder 129 has traveled well to the rearward of sealing member shoulder 144. In the preferred embodiment of the invention, the switch 36A (FIG. 2) of vaccum brake switch 22 is designed to operate the automobile's torque converter clutch (TCC), switch 36B is designed to activate the anti-lock brake system circuit (ABS) and the vacuum switch mechanism 36C is designed to operate the cruise control (CC) mechanism. In the embodiment described, the TCC switch 36A is normally closed and is designed to open at between 0.099 inches and 0.137 inches of plunger 30 travel; in this range of travel, cam follower 33A travels up slope 138 of cam surface 116 to the raised portion 116A and opens switch 36A. Preferably, the CC switch 36C is normally under vacuum and is designed to vent at between 0.203 inches and 0.238 inches of plunger 30 travel; in this range, shoulder 129 pushes against shoulder 144 urging the sealing tip 42 out of vent hole 44, venting the vacuum line (not shown) attached to nipple 92. Preferably, the ABS switch 36B is normally closed and is designed to open at between 0.390 and 0.429 inches of plunger 30 travel; in this range of travel, cam follower 33B falls down slope 136 to drop 133 and opens switch 36B. Preferably, the maximum plunger 30 travel is 0.475 inches.

A feature of the invention is that the air that passes from outside vacuum brake switch 22 to vent hole 44 must pass through a maze means 290 (FIG. 12). The maze means is comprised of first baffel 60 (FIG. 3A), second baffle 86 (FIG. 4D), and the walls of channel 52 in plunger 30. First Baffle 60 is a hollow semi-cylindrical wall extending upward from the bottom of switch chamber 57A, which wall forms a cylindrical first vent duct 98 that passes from vent hole 58 to the area of the top, front corner of switch chamber 57A. Second baffle 86 is a semi-cylindrical wall that extends downward from the undersurface of plate 45 of housing cover 46 and forms a second vent duct 61 between it and the outer wall of first baffle 60. In order to pass from vent hole 58 in housing body 56 to vent hole 44 in vent passageway 50, air must pass up first vent duct 98 and then down second vent duct 61. The air must then pass through switch chamber 57A and over the walls of channel 52 to reach vent hole 44. In addition to forcing the air to take a convoluted path, the path gradually widens from duct 98, to duct 61, to switch chamber 57A causing the air to slow. The numerous right angle turns and the gradual slowing causes the heavier dust and dirt particles to drop out of the air stream and collect on surfaces along the path. This maze means further contributes to the reliability and long life of the vacuum brake switch assembly.

A feature of the invention is that all the surfaces that slide against one another as the plunger moves, such as cam surfaces 114 and 116, cam followers 36A and 36B, the outer surface of sealing member body 140 and the walls of channel 52, all are relatively hard and are made of materials that are durable under such sliding action. The softer sealing tip 42 does not slide on any surface, and unseats and reseats seats only once each each time the brake pedal is depressed.

A novel automobile brake switch assembly that is highly reliable, has a long lifetime, and has numerous other advantages has been described. It is evident that those skilled in the art may now make many changes in the assembly as described without departing from the inventive concepts. For example equivalent materials and parts may be used. Switches may be removed or added. The parts may take on many different shapes and dimensions. Thus the invention should be construed as embracing each and every novel feature and novel combination of features present in and possessed by the invention described.

What is claimed is:

1. An automobile brake switch assembly comprising:
    a housing including: a switch chamber, a vacuum passageway having a passageway vent hole therein; and a plunger chamber communicating with said switch chamber;
    a plunger slidable within said plunger chamber;
    one or more switches enclosed in said switch chamber and operable by said plunger;
    a sealing member;
    said plunger including means for slidably supporting said sealing member so that as said plunger moves back and forth in said plunger chamber said sealing member alternately seals and unseals said passageway vent hole; and
    spring means located between said plunger and said sealing member for permitting said plunger to continue moving when said sealing member is stopped and seated in said passageway vent hole.

2. An automobile brake switch assembly as in claim 1 wherein:
    said means for slidably supporting comprises a channel formed in said plunger, said channel being elongated along the direction of movement of said plunger; and
    said vacuum passageway comprises a hollow member extending from said housing into said channel.

3. An automobile brake switch assembly as in claim 2 and further including:
    a slot formed in said plunger and communicating with said channel; and
    a plunger guide member extending from said passageway to said housing and passing through said slot in said plunger.

4. An automobile brake switch assembly as in claim 3 and further including a hole in said housing and wherein said plunger guide member includes a pin extending into said hole in said housing.

5. An automobile brake switch assembly as in claim 1 wherein said passageway vent hole is a circular hole and said sealing member includes a cone-shaped sealing tip, with the base of the cone having a diameter larger than said vent hole.

6. An automobile brake switch as in claim 1 and further including:
    a housing vent hole in said housing permitting air to pass from outside said housing to said passageway vent hole; and
    maze means formed in said housing for preventing dust exterior of said housing from passing to said passageway vent hole.

7. An automobile brake switch as in claim 6 wherein said maze means comprises one or more baffles about said housing vent hole.

8. An automobile brake switch as in claim 1 wherein said sealing member comprises a rigid body portion having an opening for receiving said spring means and a relatively flexible sealing tip portion.

* * * * *